United States Patent
St. Jacques et al.

[11] Patent Number: 5,870,727
[45] Date of Patent: *Feb. 9, 1999

[54] RULE-BASED SYSTEM FOR THE PROVISION OF COMPLEX NAVIGATIONAL LOGIC

[75] Inventors: Michael G. St. Jacques, Tampa; Delano C. Stevens, Valrico, both of Fla.

[73] Assignee: GTE Data Services Incorporated, Irving, Tex.

[ * ] Notice: The terminal 12 months of this patent has been disclaimed.

[21] Appl. No.: 445,605

[22] Filed: May 22, 1995

[51] Int. Cl.$^6$ .................................................. G06F 15/18
[52] U.S. Cl. ............................................ 706/11; 345/357
[58] Field of Search ..................... 395/12, 155; 345/326, 345/357; 706/11

[56] References Cited

U.S. PATENT DOCUMENTS

| | | | |
|---|---|---|---|
| 4,775,935 | 10/1988 | Yourick | 345/357 |
| 5,103,498 | 4/1992 | Lanier et al. | 395/12 |
| 5,485,544 | 1/1996 | Nonaka et al. | 395/12 |
| 5,500,934 | 3/1996 | Austin et al. | 395/755 |
| 5,509,116 | 4/1996 | Hiraga et al. | 395/155 |
| 5,539,872 | 7/1996 | Mintz et al. | 395/155 |

OTHER PUBLICATIONS

T. Fukuda, et al., "Concept and Realization of Adaptive Interface Based on User's Skill and Uncomfortableness," Proc. IEEE Int'l. Workshop on Robot and Human Communication, pp. 171–176, Sep. 1992.

*Primary Examiner*—Robert W. Downs
*Attorney, Agent, or Firm*—Leonard Charles Suchyta

[57] ABSTRACT

In a client/server environment, a rule-based system for the provision of complex navigational logic in an application comprises a Navigation Analysis Vehicle ("NAV") and a Matrix Analysis Package ("MAP"). The MAP facilitates creation of navigation rules for linkage with the rest of the application. In a preferred embodiment of the invention, the NAV communicates navigational instructions to a user interface for the display and the take-down of screens and also communicates with other processes such as editors and data manipulators. After the navigation rules are created, those rules are then applied to provide navigational logic for the user interface for the processing the user interface screens. MAP creates the navigation rules in a user-friendly, C-like language and parses them into ANSI-standard C language for linkage with other processes that control the user interface.

37 Claims, 13 Drawing Sheets

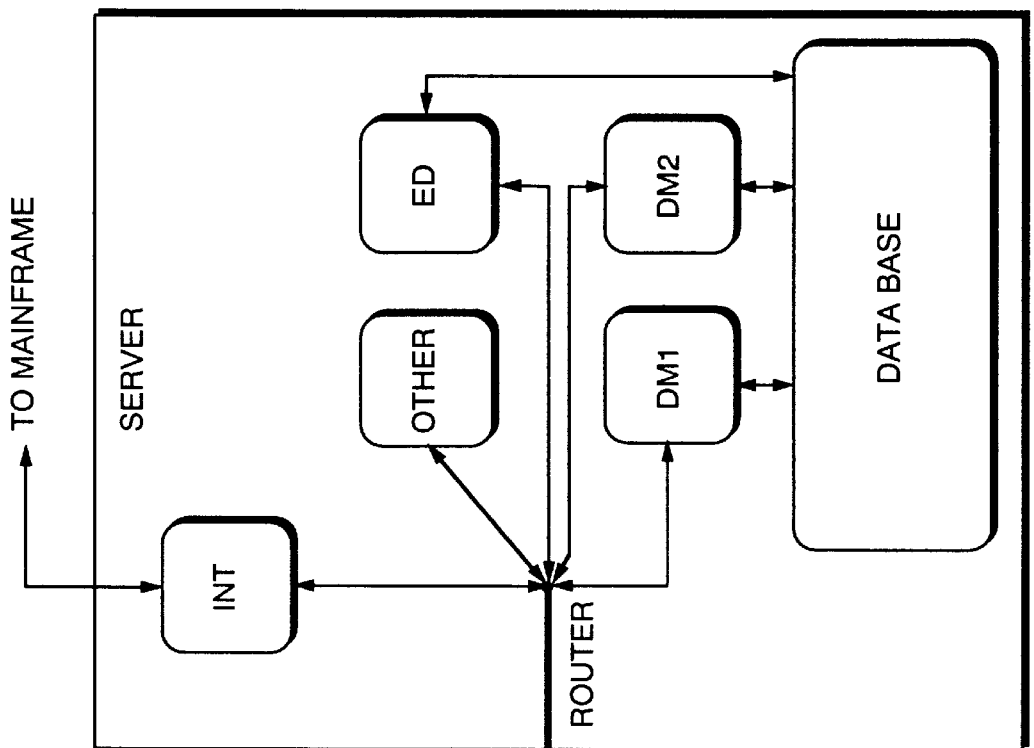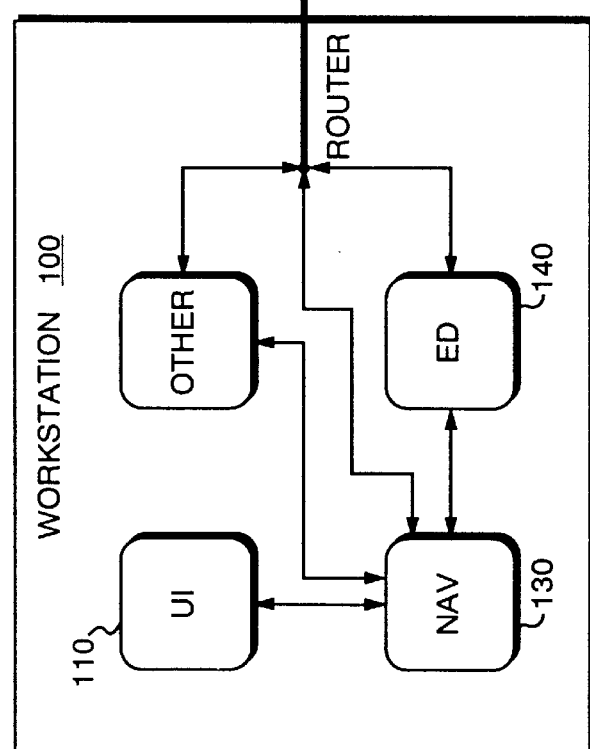
FIG. 6

RULE-BASED SYSTEM FOR THE PROVISION OF COMPLEX NAVIGATIONAL LOGIC

RELATED APPLICATION

The present invention is related to "Method of Modeling Complex Navigational Logic in a Client/Server Environment," by Michael St. Jacques and Delano Stevens, filed on the same day as the present application and assigned to the assignee of the present invention, which related application is hereby incorporated herein by reference.

COPYRIGHTS

A portion of the disclosure of this patent document contains material which is subject to copyright protection. The copyright owner has no objection to facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

The present invention relates generally to the management of information. More particularly, the invention relates to a system for automatically controlling the presentation of screen displays at the user interface of a client in a client/server environment.

BACKGROUND OF THE INVENTION

Significant advances in presentation technologies have occurred in recent years. Workstations with sophisticated user interfaces—long the sole domain of engineers and scientists—now are finding application in the broader marketplace.

New presentation software and standardization efforts have bolstered this migration to a larger commercial environment. X-Windows software from MIT and its X-Consortium are illustrative of such development. The combination of X-Windows with other standards, such as OSF/Motif, UNIX and C, has allowed application developers a new freedom from many platform issues and has enhanced the efficiency in the creation of user interfaces (UIs).

In spite of such strides in efficiency and much continuing work in X-Windows, one of the most time consuming tasks in creating working UIs has received little or no attention—the development of software to control the screens a user sees and the sequence with which those screens are presented. Throughout this disclosure, this type of software is referred to as navigational logic.

Currently, the only mechanism provided within X-Windows and many other environments to accomplish navigation is through what are generically referred to as "callback" routines. That mechanism provides a means of linking the processing of a function to an X-Event such as a button push or the filling in of a field on the screen.

With callback functions it is possible to achieve certain navigational goals. For example, a callback might be executed from a button press in the current screen which unmaps that screen and presents another subsequent screen. The approach has value, but it becomes cumbersome when the navigational logic is more complex than simple screen-to-screen traversal.

Transition Networks

Transition networks are a well known method of representing state information. In this patent disclosure, transition networks are utilized to illustrate transactional flow through a set of screens and events (states). Notation has been added to describe some of the complexities in real systems, which are more fully described. Two examples illustrate the methodology: a simple transactional flow and a complex transactional flow.

Simple Navigation

FIG. 2 illustrates a simple transactional flow. This flow could easily be described and controlled with callback routines. The boxes are states in the flow. To the user of a system, they are screens. The connecting lines are transitions from screen to screen.

When a departure is made from a particular screen, the line indicates this transition to the next screen. The lines are called transition lines. If a screen remains visible upon departure from the screen, the letter V appears on the transition line near the screen which remains visible. If, on the other hand, the screen disappears from view the letter D appears. Direction is important and arrowheads are used to indicate direction on the diagram. An arrowhead pointing away from the screen is a leaving transition. One pointing into the screen is an entering transition. If a transition line has an arrowhead on both ends it simply means that there exists a two way path between the two screens. Therefore each screen can get to the other somehow. An example of this is a screen which has sub-screens or child screens which it can access as needed. If a parent screen remains visible while its child is accessed, it is possible for the parent to have more than one child screen visible at a time. In addition, children screens can have children in which case they are parents as well as children.

If more than one line emanates from a screen, a choice is possible and navigational logic must dictate the appropriate path. The logic can be based on both user input (e.g., a button press) and other state information. Conversely, if more than one path ends-up at a screen, it has no special meaning because the logic has been applied at the leaving end to get there.

In FIG. 2, the flow proceeds from the start, at Screen_1, to the last screen at Screen_8. Departure from Screen_8 indicates completion of the transaction (ground symbol). Screen_2 and Screen_4 are child screens of Screen_1 and Screen_3 is a child of Screen_2. Traversals from Screen_1 to Screens 2 or 4 (or 3) do not "make progress" in the flow through the transaction. That is, the user is getting no closer to the goal of completing the transaction in a diagrammatic sense although the user may be making great progress from the standpoint of customer satisfaction etc. Therefore, these transitions are shown at right angles to the flow or at least off of the direction toward the final screen (Screen_8 in this case). Screens 2, 3 and 4 are, in fact, optional to completing the transaction.

Screen_5 is the next screen which makes progress toward completing the transaction and it is not optional. Then a choice exists in which traversal can be to either of Screens 6 or 7, but at least one is required. Finally Screen_8 is reached and upon its completion the transaction is complete as shown by a transition line to ground.

The screen images are shown in FIG. 3. Each transition corresponds to a button on one of the screens. As the user presses appropriate buttons, a transition occurs to the next screen. The screen event causing the transition is shown near each of the transition lines at their exit from the screen in FIG. 2 (e.g., OK on transition line from Screen_1 to Screen_5).

Note that transitions do not have to depend on button press events. They could in fact depend on user input to a field, selection from a set of "radio buttons" or highlighting a field or set of fields as well as other types of user initiated events. The button press event is used in these examples for the sake of simplicity.

This simplified example is somewhat impractical for other reasons also. It lacks the ability to cancel out of the flow and does not include priming of screens, editing or updating databases with associated error handling. It does, however, illustrate how transition networks can represent the navigational flow through a simple transaction. At this level of complexity, there is really no need for methods other than the callbacks provided in X-Windows.

Complex Navigation

To illustrate a complex case, asychronous access to a foreign machine and the ability to cancel out of the flow are added to the relatively simple flow of FIG. 2. Moreover, one of the screens, Screen_8, requires priming, editing and a database update, which illustrates a more common screen management scenario. The screens' images are shown in FIG. 4. Note that the S5 and S6 buttons on Screen_5 have been replaced with an Ok button. Now, the system will determine which path to take and present the appropriate screen. The choice will depend on the results of the asychronous access to a tier three machine which is simply called Async_Transaction.

Async_Transaction is supposed to begin when a departure is made from Screen_1. This includes any transition to another screen whether it be a child of Screen_1 (Screens 2 or 4) or the next screen in the flow (Screen_5). The advantage of starting Async_Transaction at any of these transitions is that if child screens are visited, there is more time available for the transaction to complete while the user is doing useful work.

The transition network is shown in FIG. 5. The beginning of Async_Transaction is illustrated by a bold vertical line on the right side of Screen_1. Any transition line starting on the bold line initiates the asynchronous transaction. Note that this does not include the Cancel button which takes one of two possible paths depending on whether or not Async_Transaction has begun.

The processing of Async_Transaction is also represented as a transition network but with less detail than the one which represents the transactional flow through the UI. States or events having to do with Async_Transaction are represented by the elongated boxes. Complexities of the access to the foreign machine which are of no interest are represented by the large shaded box labeled Async_Transaction-Intermediate (ATI). Unshaded, elongated boxes are final events indicating completion. Shaded ones indicate intermediate results requiring further user input to resolve some issue. The screens Fix_1 and Fix_2 are made available for this purpose. They are connected both to the UI flow and to the flow of Async_Transaction as indicated by the two-way transition lines.

The small circular dot to the right of Screen_1 represents the fact that any of the transition lines connected there can occur as a result of a single X event (e.g., a button push). For Screen_1, pressing the OK button (FIG. 4) can result in taking any of the paths shown. There are five possible paths and the one taken at any given time depends on both the intermediate and final results of Async_Transaction.

Examining these transitions more closely reveals the complexities involved. First, the three screens which are connected both to ATI and to the UI flow are intermediate screens which only appear as necessary. The two Fix screens appear only when:

1. The user has pressed OK on Screen_1 to move on in the flow.
2. Async_Transaction has reached an intermediate stopping point in its flow and needs user input (via Fix_1 or Fix_2).

The Wait screen appears only when:

1. The user has pressed OK on Screen_1 to move on in the flow
2. Async_Transaction is still in process (ATI) and is not currently at an intermediate or final state.

The Fix screens return control to Async_Transaction when their OK button is pushed. The Wait screen has no buttons. It just appears when it should and disappears when it should. In this case, the transition line between Screen_1 and the Wait screen means simply that the Wait screen will appear at this point in the flow if it is appropriate for it to do so. How this is accomplished will be discussed in the next section. The exit from Screen_1 represents the last point in the flow where useful work can be accomplished prior to getting results back from Async_Transaction.

Clearly, a number of scenarios are possible when the user presses Ok in Screen_1. One possibility is that Screen_5 appears without any intervening Fix screens or the Wait screen. This would be the case if Async_Transaction proceeded to a successful completion faster than the user progressed to the Ok button on Screen_1 and there were no clarifications (Fix screens) necessary. If, on the other hand, Async_Transaction completes more slowly than the user, the Wait screen appears. Among other possibilities, Async_Transaction could fail at which time the user is presented with Cleanup and the transaction in finished, albeit unsuccessfully.

Note that the Fix screens could be required to appear at other points in the UI flow. This would be represented by connecting their UI transition lines to those points. It is also possible that one asynchronous transaction could trigger another. In many systems multiple asynchronous transactions are initiated one from the other. The transition network becomes complex but the behavior is entirely describable. Making these behaviors occur as required will be discussed in the next section.

The other two transitions exiting from Screen_1 are connected to unshaded, elongated boxes or final events. Only one of these paths is allowed, therefore a switch notation is used to help represent these cases. When Async_Transaction reaches a final state, the switches connected to that state (by the curved lines) are closed, thus allowing the UI flow to proceed along that path(s). So, if Async_Transaction fails, the user is presented with a Clean_Up screen after pressing OK on Screen_1. Also, all attempts by the user to cancel after Async_Transaction has begun see the Clean_Up screen on the way out. Only a cancellation from Screen_1 prior to initiating Async_Transaction avoids being presented with Clean Up.

Async_Transaction can succeed in two possible ways (Success_6 and Success_7). Screen_5 is always the next screen in the flow, thus both success conditions activate the switch between Screens 1 and 5. The switch from Screen_5 to Screen_6 is activated by Success_6 indicating that this is the required path. Conversely, Screen_7 is made available instead of Screen_6 when Success_7 has occurred.

As complex as this flow appears to be, it still leaves out numerous details. For example, it only includes one screen which must be primed with data, edited and updated when, in fact, most screens require these actions. In addition, no error conditions are checked and handled.

Client/Server Architecture

Many modern systems are based on a three-tier, client/server architecture in which work is distributed over a number of processors. At the first tier, users interface with the system through easy-to-use graphical screens presented on workstations. Significant savings in user efficiency can be realized with a graphical user interface (GUI) based on the X-Windows System and OSF/Motif standards.

Workstations are linked via Ethernet to servers at tier two which handle some data management tasks and communicate with other systems as shown in FIG. 1. Often, workstations and servers run under UNIX and software is generally written in the C programming language. Tier three consists of mainframe computers and timeshare systems which, for example, access corporate data repositories for customer records, service orders and other data.

Navigational Complexity in Modern Systems

In more advanced systems, the user is guided through the complex transactions by the system. This factor is often critical to cost savings because it allows less experienced people to competently use the system. However, this user-friendly approach complicates the navigational aspects of the system.

The correct screen must appear to the user at the proper time without user intervention. At certain points in the transaction, however, the user must have substantial flexibility in choosing screens. Often, both of these requirements have to be met simultaneously with navigational logic. It is also often necessary to control which fields are available to a user or to impact the field-to-field flow.

Transactions often require at least one and, more frequently, two or three asychronous accesses to tier three computers. During these sometimes lengthy excursions, certain screens are presented or are at least made available to users. This is often done so that the users can take any additional information from the customer which can logically be obtained prior to receiving a return response from the tier three computer. When results do come back, they often influence which screens must appear in the flow and possibly how the transaction must proceed from that point forward. The navigational logic must have the capability to handle these situations.

A second factor contributing to navigational complexity stems from the fact that many modern systems are to be implemented globally at a large number of locations. Each location has its own methods of doing business based on local demographics. Therefore, screen availability and order of presentation have to be controllable by the local user group. Often, to accomplish this, a table is periodically edited. The table is subsequently read by the system at start-up and the screens presented accordingly.

A third factor is the result of recent industry trends for rapidly creating specialized services and bringing them to market quickly. Of course, part of bringing any service to market includes integrating the service into a company's operational support systems. System integration has traditionally been a slow process but in recent years the need for faster integration has become much more evident.

For all the above-stated considerations, there is a need for a methodology, which can accommodate more complex navigation, that is more sophisticated than the use of callback functions provided by X-Windows. The new methodology for creating navigational logic must be efficient and responsive to transaction requirements, while providing features of speed of development, maintainability and flexibility.

SUMMARY OF THE INVENTION

Accordingly, an advantage of the present invention is the provision of a rule-based system for managing messages between clients, servers or other interfaces, while retaining the complex relationships that affect the order and appropriateness of actions with an application.

Another advantage of the present invention is the provision of a novel, time-saving approach to creating complex navigational logic.

Another advantage of the present invention is the provision of a C-like language parser which facilitates the creation of navigational rules.

Another advantage of the present invention is the ease of maintaining navigational code because the navigational code is disposed in a centralized location and is isolated from the UI.

Yet another advantage of the present invention is that complex navigational relationships are more easily envisioned, described and implemented.

The above and other advantages of the present invention are carried out in one form by a novel, time-saving technique for providing complex navigational logic, which has been developed as a general method. In this document the general method will be referred to as the Navigational Analysis Vehicle ("NAV"). NAV is a rule-based system that illustratively provides navigational logic for UIs in an X-Windows environment. NAV is supported by the Matrix Assembly Package (MAP), a C-like language parser which facilitates the creation of navigational rules.

Other advantages and features of the invention will be apparent from the following description of the preferred embodiment thereof and from the claims herein.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

FIG. 6 schematically illustrates the software architecture of a typical client/server system.

DESCRIPTION OF THE PREFERRED EMBODIMENT

The preferred embodiment of the present invention is a three-tier, client/server architecture in which work is distributed over a number of processors. At the first tier, users interface with the system through easy-to-use graphical screens (i.e., a graphical user interface or GUI) presented on workstations that are well known to those skilled in the art. Typically, workstation hardware includes a display capable of simultaneously presenting multiple graphical user interface ("GUI") screens and include a processor and memory for utilizing this invention. The GUI screens are based on the X-Windows System and OSF/Motif standards. For this implementation, the HP 9000 server workstations from the Hewlett-Packard Company are used.

Figure 1:
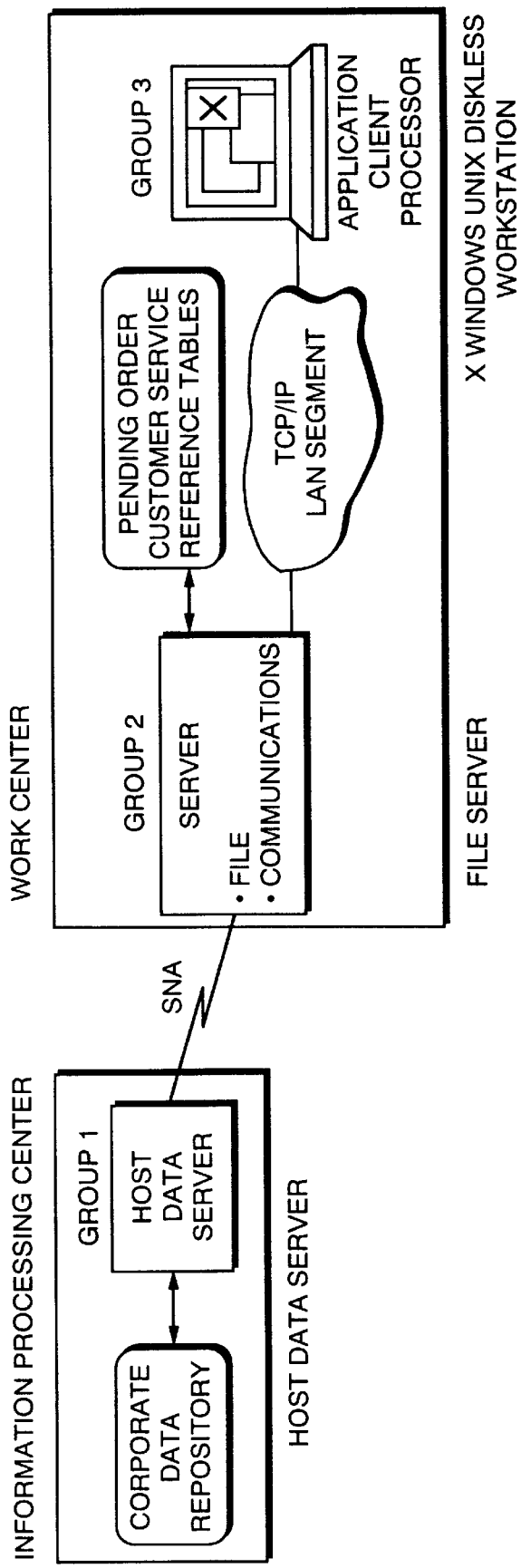
FIG. 1 illustrates a typical client/server hardware configuration including workstations linked with a server, which is linked with a mainframe computer and other external hosts.
Figure 2:
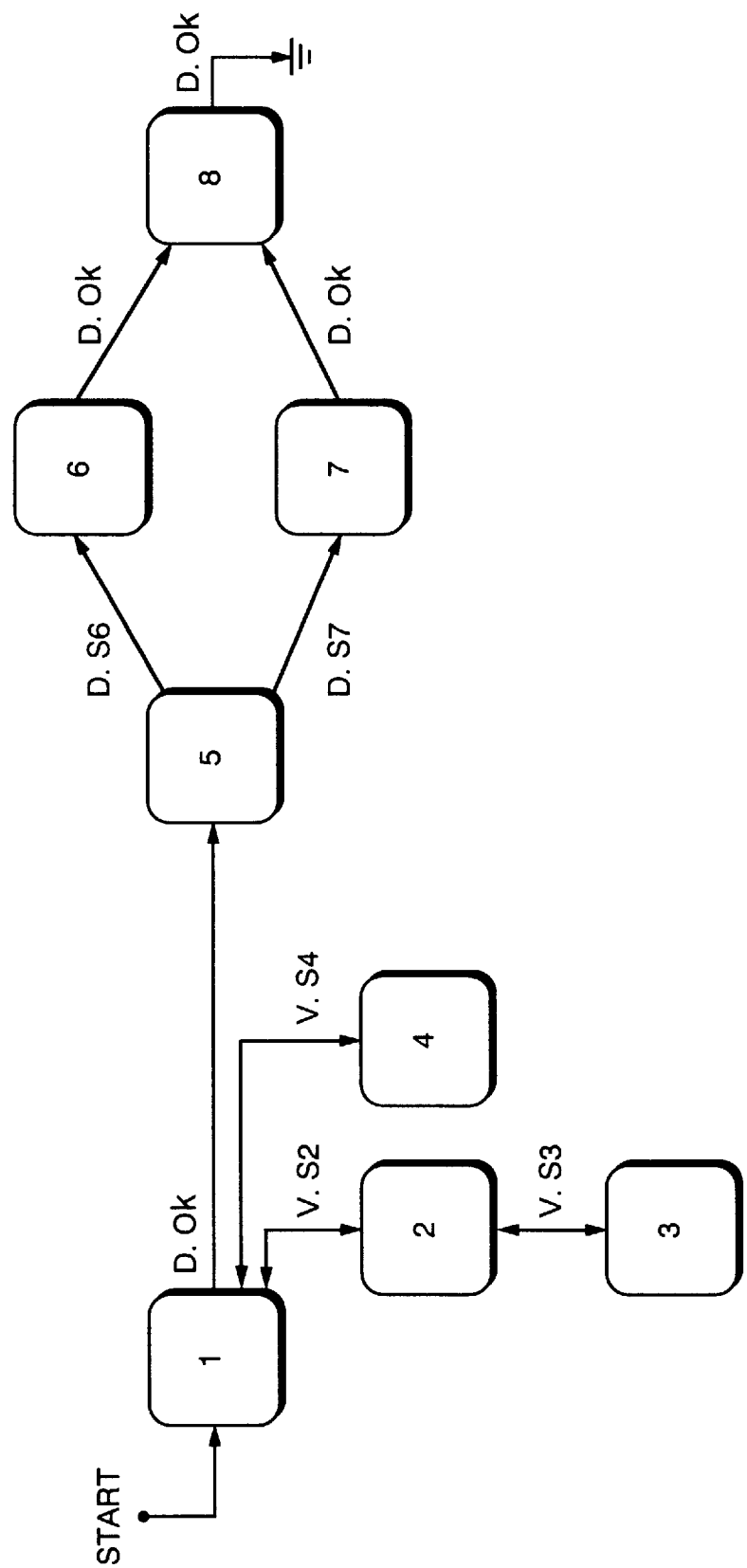
FIG. 2 illustrates a transition network representation of what would be considered a simple transactional flow including eight screens.

The diskless workstations are linked via Ethernet to servers at tier two which handle some data management tasks and communicate with other systems as shown in FIG. 1. For this implementation, HP 9000 Series servers, also from the Hewlett-Packard Company, are employed. Both the workstations and servers run under the UNIX operating system and all software is written in the C programming language. Tier three consists of mainframe computers and timeshare systems which access corporate data repositories for customer records and service orders and other data.

Navigational Analysis Vehicle ("NAV")

The approach to navigational logic disclosed herein is based on the two software packages, NAV and MAP. NAV communicates navigational instructions to an X Window-based user interface telling it which screens to display and take-down. NAV also communicates with other processes such as editors and data manipulators with standard, UNIX System V Interprocess Communications.

FIG. 6 illustrates the architectural relationships between the UI, NAV and other processes including editors and data manipulators (DMs). The UI 110 sends messages to NAV 130 using callbacks when events of interest occur. Examples include:

OK button is pressed in Screen_1

Cancel button is pressed in Screen_6

Other processes send messages to NAV when necessary. For example:

Async_Transaction reaches state Success_6 or Fix_1_

Required Screen_8 has been edited, updated or primed.

NAV 130, in turn, must send messages to the UI 110 (e.g., Display Screen_2). This case is different from the others because of the way the X Window system has been designed. X-Windows is event-driven and is primarily set up to receive and process events from users via the X Server. However, there is a mechanism in X-Windows to recognize input from UNIX files which include pipes and sockets as well as conventional files. This mechanism was used to establish a communication link into the UI using a combination of UNIX fifo (named pipe) and an IPC queue. The fifo was described to the UI and made available for reading with the XtAppAddInput function.

The transfer of a message is accomplished in two steps. NAV 130 knows the fifo name and writes one byte to it whenever it is necessary to send a message. NAV 130 then sends the message to the appropriate IPC queue which the UI can access. On the UI 110 side, whenever data is written into the fifo, a UI function is called which accesses the IPC queue and reads the message.

NAV's main utility comes from its ability to retain complex relationships that affect the order and appropriateness of screen presentation. The relationships are contained in a matrix of navigational rules. Each row in the matrix represents a screen or other pertinent event which can occur at an unpredictable time.

Matrix Assembly Package ("MAP")

MAP is used to create the navigation rules in a user friendly, C-like language and parse them into ANSI standard C for linkage with the rest of the application. The conceptual model of navigation resembles a spread sheet or matrix where interactions between screens and other asynchronous events are viewed positionally. In other words, the position of an interaction defines the two participants of the interaction.

The main advantages of this approach are twofold. First, the navigational code is all together and isolated from the UI making maintenance a much easier task. Second, complex navigational relationships are more easily envisioned, described and implemented.

Matrix Concepts

Figure 7:
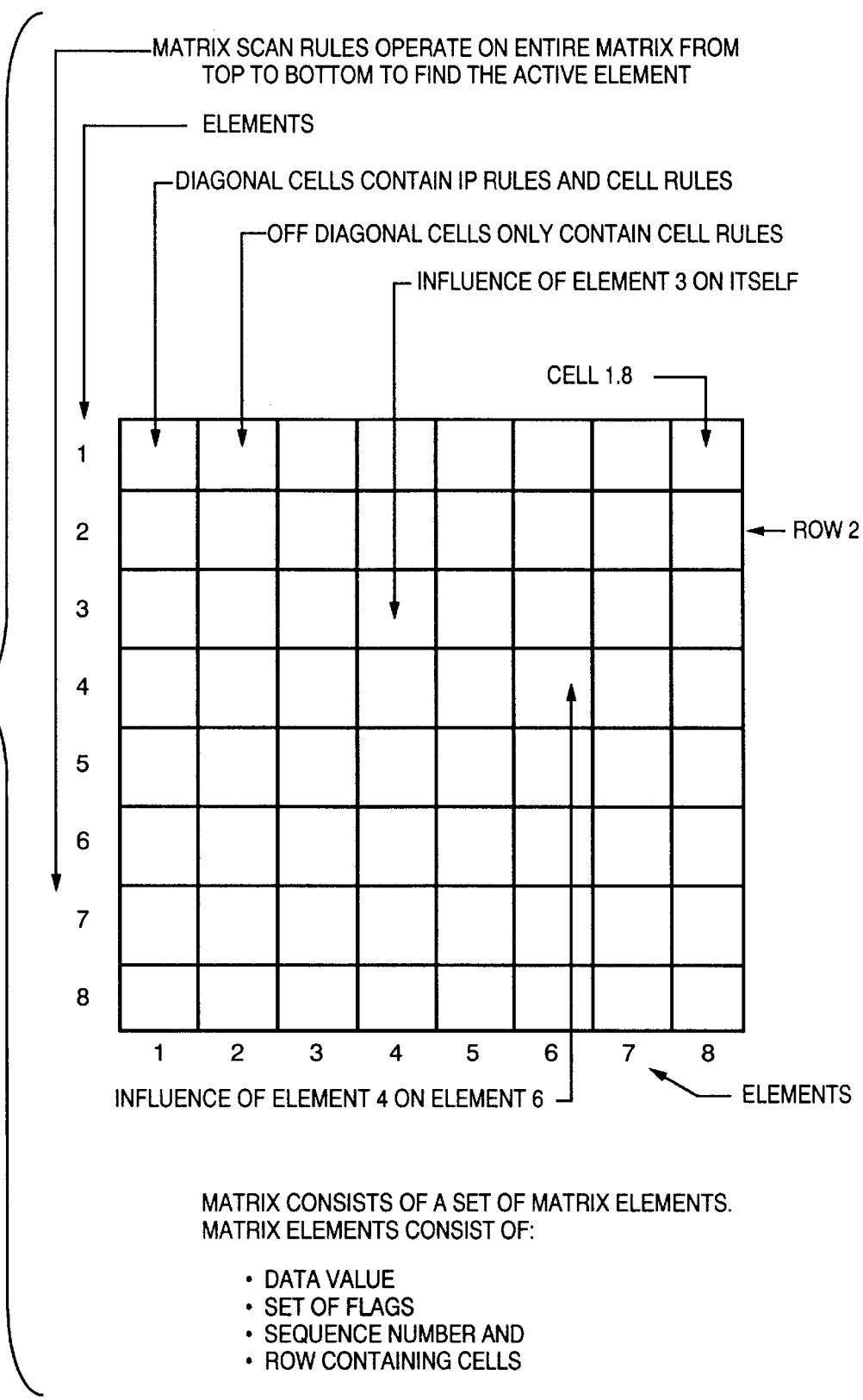
FIG. 7 pictorially illustrates the terminology and concepts embodied in the matrix approach proposed herein to organize navigational rules.

Referring now to FIG. 7, the matrix 500 looks like a spreadsheet in which each row (and column) corresponds to a screen or an asynchronous external event such as the status of Async_Transaction. The matrix is symmetric. The rows 700 and columns 600 have identical labels.

Within the matrix 500, each cell contains a description of the effect of one row on one column (i.e. another row). The cell may contain any combination of values, processing steps, decision rules or indicator flags to express and alter the state of its row or other rows. In essence, the matrix describes how activities carried out in one window can affect other windows in the system and organizes these interactions in such a way that they are easy to describe and modify.

Multiple cause-and-effect relationships are organized into rows and columns. The row and column labels identify the names of the elements in the matrix, where an element is any value in the system which may effect another value. Therefore, the names of matrix elements are the names of rows (or columns).

The terms (element and row) are somewhat interchangeable but are differentiated as follows. Elements consist of a data value, a set of flags and a row containing cells.

There are as many cells in every row as there are elements in the matrix. The diagonal cell of any element's row represents the element's influence on itself. Other cells in the element's row represent the element's influence on other elements. Reading the contents of cells along an element's row describes how that element effects other elements in the system. Reading down its column describes how the element is affected by other elements.

The matrix model of a transactional flow is completely described using the following building blocks:

1. A set of elements each of which consists of a data value, a set of flags and a row containing cells. Cells "contain" cell rules described below. In the special case of diagonal cells, the cells "contain" initial processing (IP) rules which are a special set of things to do when the element becomes the "active" element. Only one element is active at any point in time.

2. A set of cell rules describing how elements in the system interact with one another (and themselves when the cell rule exists "in the diagonal cell").

3. A set of "matrix scan rules" which are used to determine which element is the next (or first) active element.

Matrix Elements

A matrix element can be any entity whose individual state affects the overall state of the system. Therefore, the entities chosen to be elements depend on the granularity of control required. For example, an element may represent a screen, a set of screens, the status of a particular data field on a screen, or the status of an asynchronous event such as Async_Transaction. Typically, all elements are selected to be at the same level of granularity although this is not a requirement. For the simple transaction discussed in TABLE I, the 8 screens correspond to the elements of the matrix. The complex navigational example includes 13 elements, the 12 screens which can appear and the status of Async_Transaction. These examples will be expanded below.

The dynamic behavior of elements is described by the IP rules contained in diagonal cells and in the cell rules. IP rules are executed only when an element becomes active. An example of an action which probably belongs in the IP rules is priming or displaying a screen. Cell rules are executed only when the data value (see below) of the row changes. Both IP rules and cell rules are C functions, which manipulate element flags and data values. The only difference between the two types of rules is when they get fired.

Each element has a set of descriptors (a data value, several flags and a sequence number) to hold its current state. These descriptors are more fully discussed below. Initial values for element flags are read from a table when the application is started. This table may be accessed by the user group to customize the application.

The sequence number defines the relative order of the element. This is meaningful to the algorithm which finds the next active element to be discussed later. The VALUE descriptor contains the current data value for the element. It may be set from other elements in the matrix or set by means of messages received by NAV.

The element flags are boolean only taking on the two values TRUE and FALSE. These flags are named:
  IGNORE
  AVAILABLE
  IMMEDIATE
  WAIT
  INSERT
  REQUIRED
  COMPLETED
  OPEN
  DATA_ONLY
  DATA_CHANGED The IGNORE flag indicates whether the element should be included. If the IGNORE flag for an element is set to TRUE, the element is essentially excluded from the matrix. This flag may be set by the end user and is useful for elements which are discretionary such as optional or regional screens.

As the name implies, the AVAILABLE flag indicates whether an element is available to be made the active element at the current time. It can be thought of as a more temporary flag than IGNORE.

The IMMEDIATE flag indicates that the element is a candidate for activation under the highest priority matrix scan rule (discussed below). The IMMEDIATE flag is generally used to immediately introduce a window into the normal flow. Examples would be error message windows, optional (child) windows selected by the user or other conditions requiring immediate user response.

Figure 5:
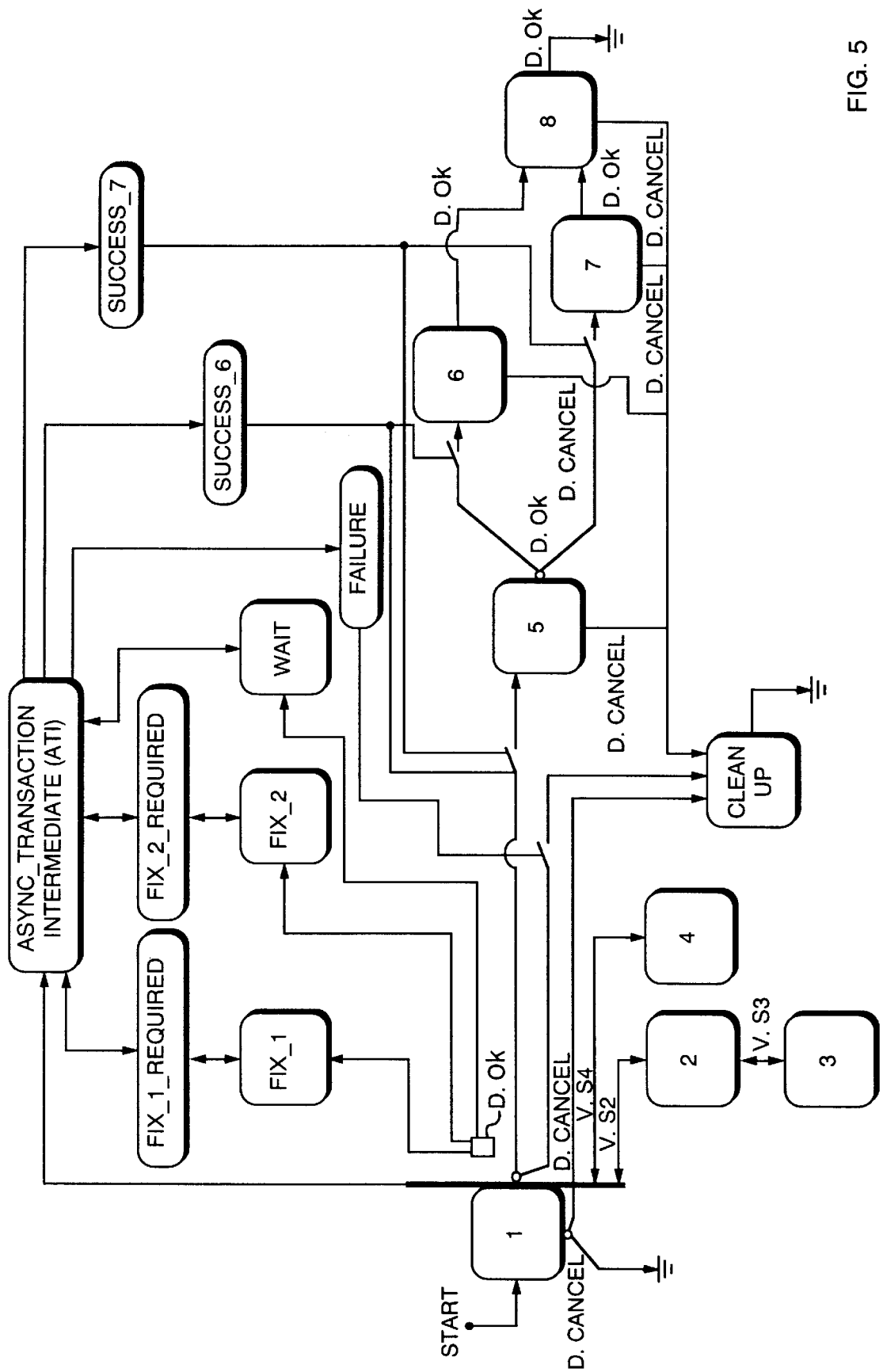
FIG. 5 illustrates a transition network representation of what would be considered a complex transactional flow including twelve screens and interaction with an asychronous event.

The WAIT, REQUIRED and INSERT flags all have the same (lowest) priority to the matrix scan rules. WAIT flags are used when a barrier must be placed on further normal flow processing rules (i.e., a wait state). The Wait screen shown in the complex transaction of FIG. 5 is an example. INSERT flags are used when a screen which is only sometimes needed is to be inserted into the normal flow. Screens Fix_1 and Fix_2 in FIG. 5. are examples. Either screen may be "inserted" into the normal flow so that Async_Transaction can complete. The REQUIRED flag indicates that the window must be completed by the user before a given sequence of windows can be finished. It is generally preset to indicate which screens are required to complete a transaction. In the examples, Screens 1, 5, either 6 or 7 and 8 are required.

The COMPLETED flag is set to TRUE when the screen represented by the element has been logically completed. This allows NAV to know how much of the transaction is finished thus assisting in the choice of the next active element. Generally a value of TRUE means that a window has been populated with all required fields or in the case of the two examples, "Ok" has been selected.

The DATA_ONLY flag indicates that the element represents a status of some kind and does not represent a window displayed to the user. In the complex flow of FIG. 6 the element which represents the status of Async_Transaction is an example of a DATA_ONLY element.

The OPEN flag indicates that a screen is currently displayed on the user's workstation. In the case of a DATA_ONLY type element, the OPEN flag is meaningless and is not used. Similarly, the OPEN_LINK identifier indicates the next window in a list of open windows and helps keep track of parent-child dependencies.

A value of TRUE for the flag indicates that a change has been made to the element's VALUE. Note that the DATA_CHANGED flag is set only when the element's data value is changed, not when flags are changed.

Typical Flow of Work

A transition network of the required transactional behavior is first created from which a description of the matrix is devised and placed in a matrix file. This file contains a description of all elements which comprise the matrix including initial flag values, a sequence number, IP rules and any cell rules. Examples of these will be presented for the two previously discussed cases and syntax will be discussed at that time.

Once a matrix file has been created, the matrix file is compiled by MAP into several code modules and header files. These modules and header files are then linked to and accessed by NAV. NAV contains a matrix data structure with a list of all the elements, their flags, data values and sequence numbers. Cell and IP rules are translated by MAP into C functions. NAV's matrix data structure contains pointers to these functions, thus allowing access to them as though they were organized by rows and columns.

The MAP-generated code is processed by NAV using the logic described below. In addition to processing the MAP-generated code, NAV also processes messages that NAV receives from the UI or other processes. Those messages contain new data values for matrix elements and are constructed by the UI and other processes (e.g., editors and DMs) to inform NAV of significant events which determine the further flow of the application. These events include, illustratively, entry of data into a particular field, an indication that the user has pressed a button, or a return from an external process.

Navigational Algorithm

Figure 8:
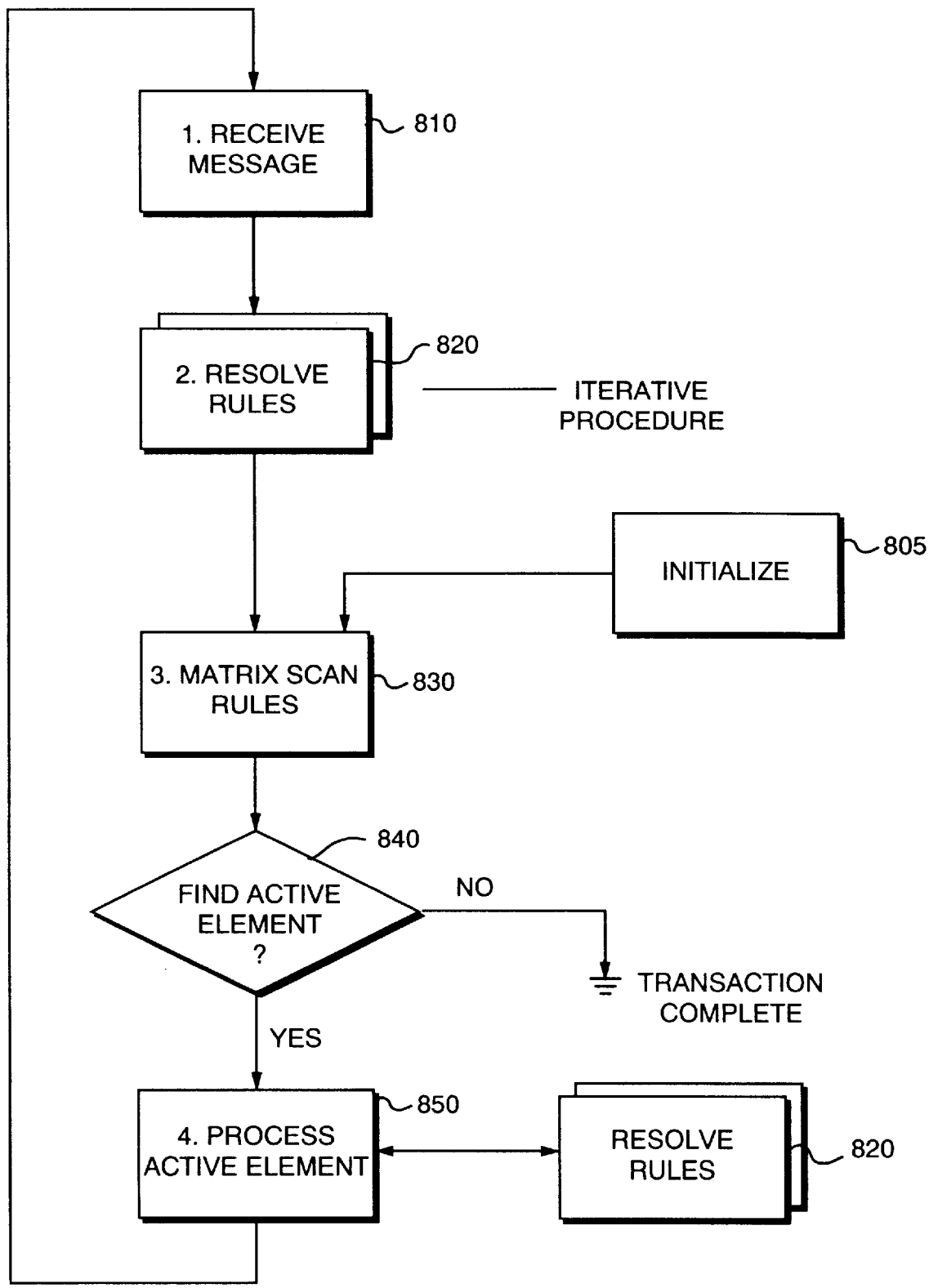
FIG. 8 schematically illustrates the flow of steps for the navigational algorithm embodied in the NAV software.

Turning now to FIG. 8, after initialization, the Navigational Algorithm is cyclic and begins when a message arrives at task 810. The salient steps in the Navigational Algorithm include:
  1. RECEIVE MESSAGE (Task 810)
  2. RESOLVE RULES (Task 820)
  3. RUN MATRIX SCAN RULES TO FIND THE "ACTIVE" ELEMENT (Task 830)

4. Process the Active Element (Task 840)

Each step is described fully in turn below.

STEP 1. RECEIVE MESSAGE. When a message arrives, it is read from the input queue. Part of the message contains a element name to which the message is addressed. The element's data value (row_no.VALUE) is set to a unique message identifier (e.g., Screen2OkSelected, which has been #defined to type integer). The element to which the message was addressed now becomes the current (not active) element.

STEP 2. RESOLVE RULES. At task 820, if the now-current element's data value has changed (thereby setting the element's data changed flag to TRUE), the data changed flag is reset to FALSE and the element's entire row is checked for cell rules which can "fire". This is called "running the row" and consists of executing the code (cell rules which can fire) in each interaction cell across the element's row starting on the diagonal at the element's interaction with itself and eventually wrapping around to itself again.

If this process changes the data value (not the flags) of any other elements in the matrix, the data changed flags for those elements are set to TRUE. If this process changes the flags only of any other elements in the matrix, the data changed flags for those elements are not set to TRUE.

Then, the rows of any other elements in the matrix whose data value has been changed are handled similarly. This is continued until no element's data value changes or until the maximum number of iterations allowed has been reached. If the maximum number of iterations allowed is reached, NAV issues an error message. STEP 3. RUN MATRIX SCAN RULES TO FIND THE "ACTIVE" ELEMENT. At task 830, determine the next matrix element to become the active element using the Matrix Scan Rules (discussed below).

If there are no elements matching the selection rules, the application is complete, and any needed cleanup and file closures are executed before terminating the NAV process.

STEP 4. PROCESS THE ACTIVE ELEMENT. At task 840, when the active element is found, if it is not yet open, execute its IP rules. In most cases, this will include priming or displaying a window. If the element is a DATA_ONLY type element (as indicated by the flag DATA_ONLY=TRUE), its OPEN flag is still checked as above, but the OPEN flag has no meaning for DATA_ONLY elements. Typically, DATA_ONLY elements have no IP rules. Finally, at task 850, another message is received at the input queue.

The IP rules can change both the data values and flags of any other elements, or it's own data value and/or flags. If data values are changed, the Resolve Rules step, as previously described above is executed, otherwise (i.e. if nothing is changed or if only flags are changed) the Resolve Rules step is not executed. The latter case (with no execution of the Resolve Rules step required after IP rules) is more typical.

If the active element is already open, bypass the element's IP rules (e.g., do nothing, the window is open & not completed)

In either case (open or not) return to the input message queue to wait for a new message.

Matrix Scan Rules Algorithm

Figure 9:
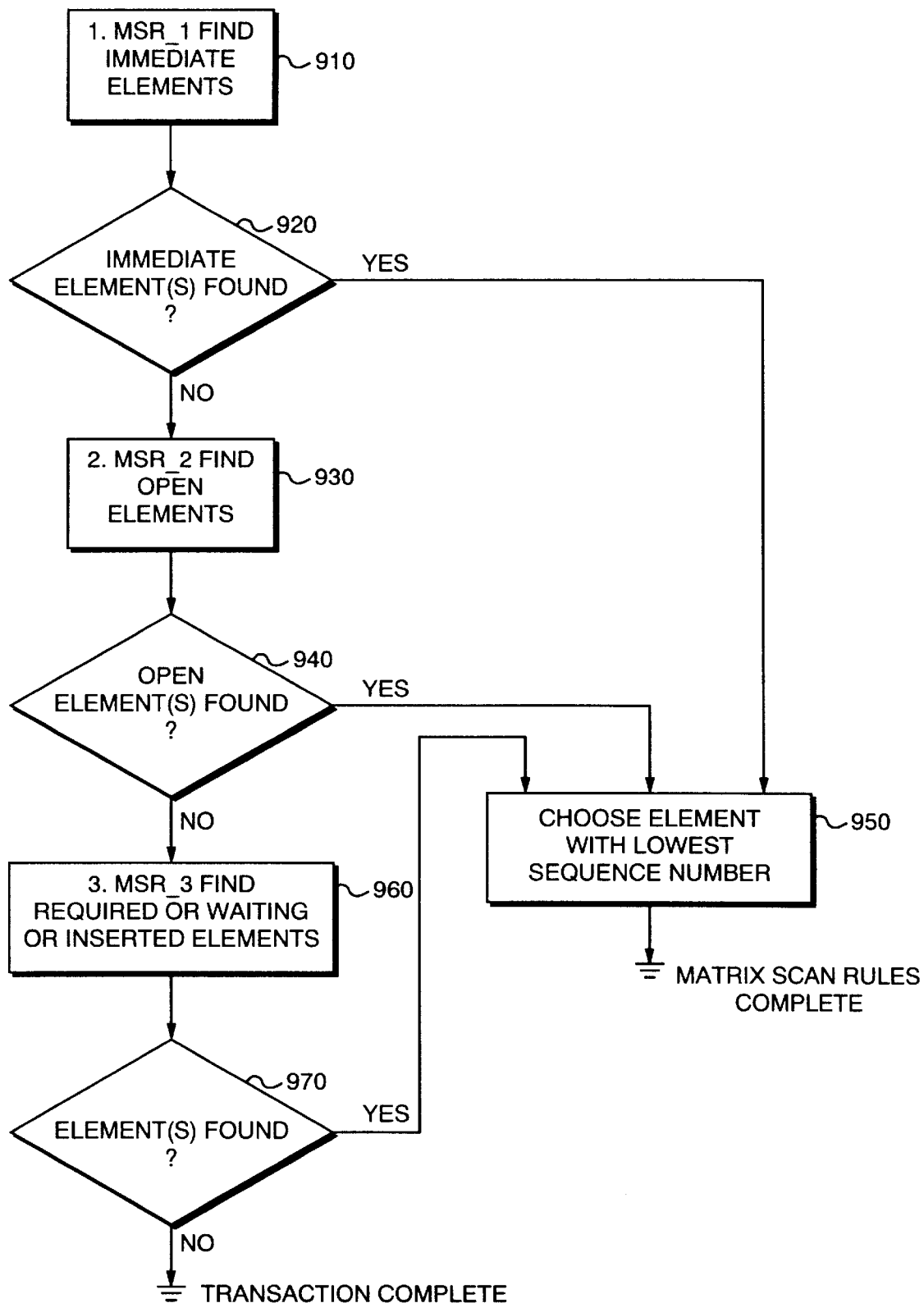
FIG. 9 schematically illustrates the flow of steps for operation of the matrix scan rules embodied in the NAV software.
Figure 10:
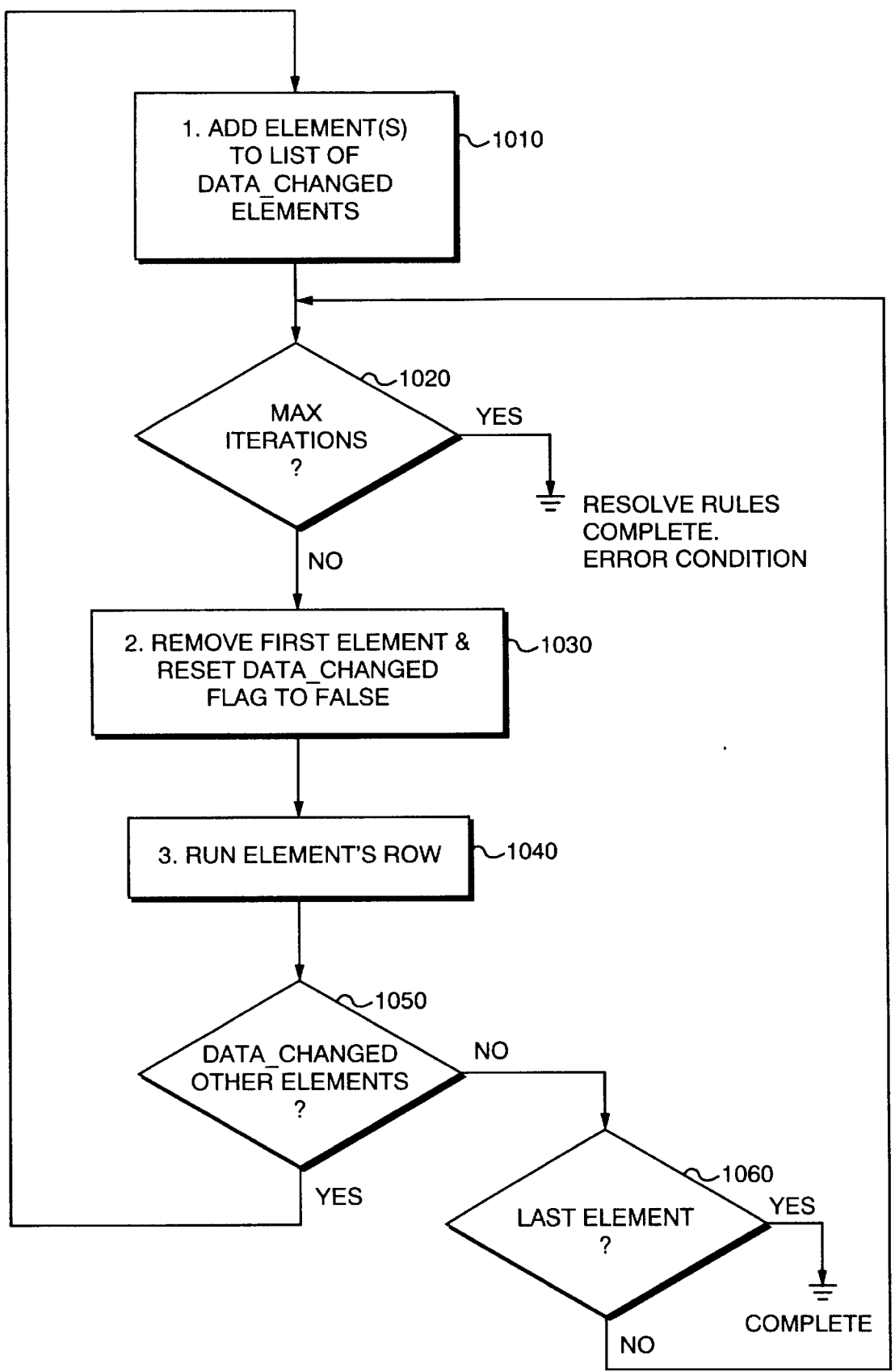
FIG. 10 schematically illustrates the flow of steps for operation of the Resolve Rules algorithm embodied in the NAV software.

Three Matrix Scan rules (MSRs) are used to locate the next (or first) active element in the matrix. The Matrix Scan rules algorithm is illustrated in FIG. 9. The rules all function by scanning the entire matrix, examining the flags for all of the elements in the matrix. Order is important, so if one of the three rules finds candidates to be the active element, subsequent rules are not checked.

MATRIX SCAN RULE 1 (MSR_1). At task 910, a search is conducted for an immediate element. All elements which are not ignored, available and immediate are found, and the one with the lowest sequence number is selected. The purpose of this rule is to force interruption in the normal required window flow. In other words, IF (the element flags are: (not IGNORED) and AVAILABLE and IMMEDIATE), THEN this rule succeeds.

MATRIX SCAN RULE 2 (MSR_2). At task 930, a search is conducted for an open element. If there are no elements which match the Matrix Scan Rule 1 above, then search for an open element. Find all elements which are not ignored, available, open, and not completed, and then select the one with the lowest sequence number. Matrix Scan Rule 2 is used to resolve open windows before initiating new windows. In other words, IF (the element flags are: (not IGNORED) and AVAILABLE and OPEN and (not COMPLETED)), THEN this rule succeeds.

MATRIX SCAN RULE 3 (MSR_3). At task 960, a search is conducted for the next required, waiting or inserted element. If there no elements which match the first or second rules, then search for the next required, waiting or inserted element. Further, find all elements which are not ignored, available, either required, waiting or inserted and not completed, and select the one with the lowest sequence number. The purpose of Matrix Scan Rule 3 is to continue with the normal, required window flow, or to alter the normal flow with a wait type screen or an inserted type screen. In other words, IF (the element flags are: (not IGNORED) and AVAILABLE and (REQUIRED or WAITING or INSERTED)), THEN this rule succeeds.

If none of the three Matrix Scan rules is matched, all required windows have been completed and all windows are closed, and the application is therefore complete.

Examples of Code For Simple and Complex Transactions

Two examples, which correspond to the simple and complex transactional flows discussed above in the BACKGROUND OF THE INVENTION section of this patent disclosure, are presented. The code describing the IP rules and cell rules is explained, along with examples of the C functions which are created from them by MAP. Operation of the Navigational Algorithm and Matrix Scan Rules is also illustrated.

A number of functions are available to NAV for sending messages to the UI, an editor, DM and ASYNC_TRANSACTION. These are used extensively within the cell and IP rules. Illustratively, these functions are:

int send_UI_message( int msg_id );

int send_EDITOR_message( int row_no, int msg_id);

int send_DM_message( int row_no, int msg_id );

int send_ASYNC_TRANSACTION_message( int row_no, int msg_id);

Note that these functions are specific to the two examples below. Other uses may require that users write their own "send" functions.

Simple Navigation

Figure 11:
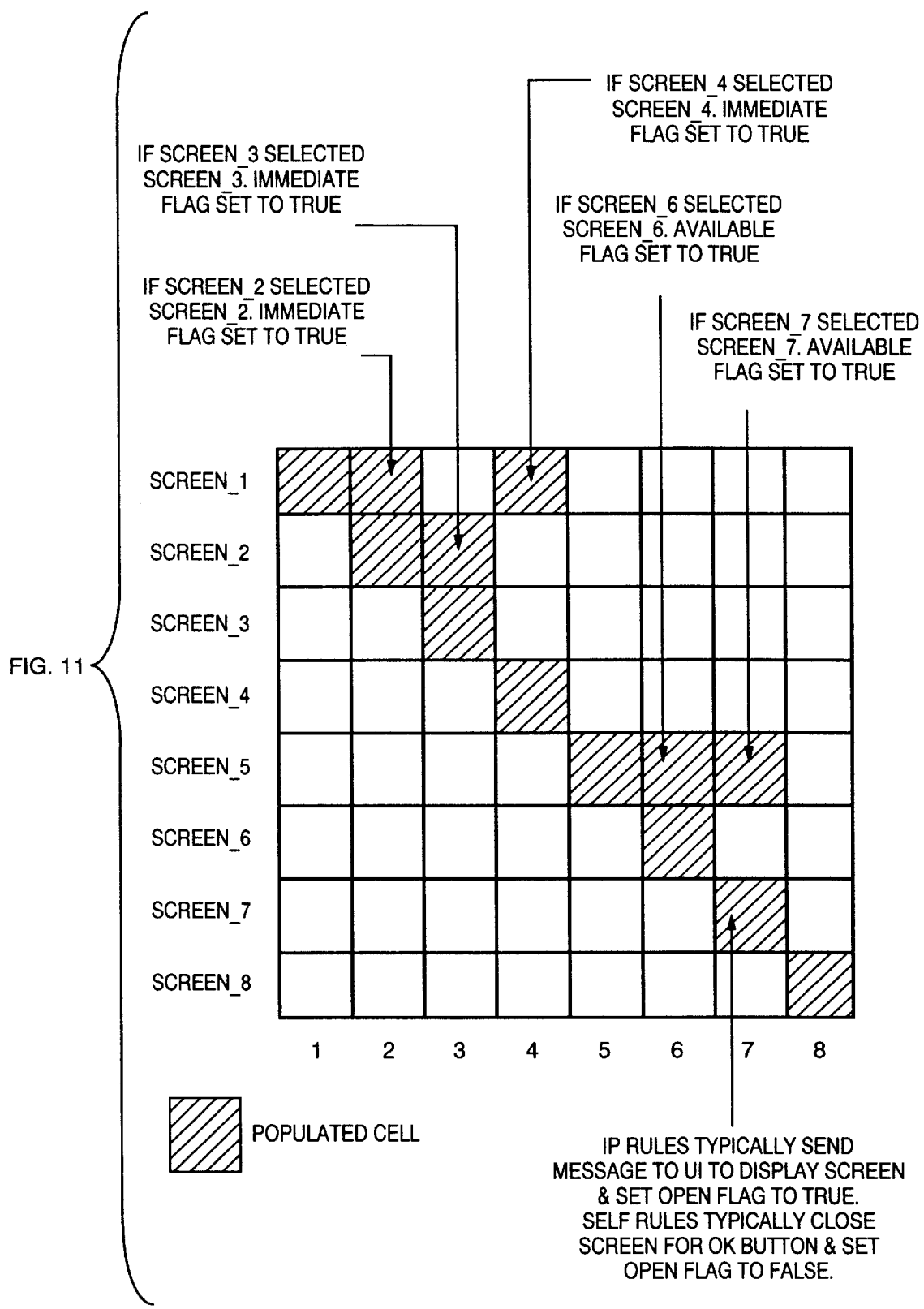
FIG. 11 pictorially illustrates the interactions and cell rules for a simple navigational case.

TABLE I illustrates the code describing the IP rules and cell rules for the simple navigational flow. In addition, TABLE II illustrates the C functions for IP and cell rules after translation by MAP. As previously mentioned, this relatively simple example includes eight elements, one for each screen in the flow. FIG. 11 illustrates the locations of cell rules for the entire flow.

(NAV-SYS.E22/94-8-111)   PATENT

- 28 -

TABLE I

MATRIX DESCRIPTION CODE FOR SIMPLE FLOW

```
/*
/*
    FLAGS

TFFFFFFFFF      IGNORE
    FTFFFFFFFF      AVAILABLE
    FFTFFFFFFF      IMMEDIATE
    FFFTFFFFFF      WAIT
    FFFFTFFFFF      INSERT
    FFFFFTFFFF      REQUIRED
    FFFFFFTFFF      COMPLETED
    FFFFFFFTFF      OPEN
    FFFFFFFFTF      DATA_ONLY
    FFFFFFFFFT      DATA_CHANGED
    FFFFFFFFFF100   SEQ_NO = 100
*/

/*
int send_UI_message( int msg_id );
int send_EDITOR_message( int row_no, int msg_id );
int send_DM_message( int row_no, int msg_id );
int send_ASYNC_TRANSACTION_message( int row_no, int msg_id );
*/

/*
8 Elements with Rows:
SCREEN_1
SCREEN_2
SCREEN_3
SCREEN_4
SCREEN_5
SCREEN_6
SCREEN_7
SCREEN_8
*/

/*
INCLUDE example_msg.h
INCLUDE cmss_structs.h
INCLUDE NSI_Res_test_Global_Messages.h FLOW example_simple_flow
*/

ROW
SCREEN_1
    FLAGS FTFFFTFFFF100
    PROC
    {
    #
        row_no.OPEN = TRUE;
        send_UI_message(Screen1Display);
    #
```

(NAV-SYS.E22/94-8-111)                                                PATENT
                              - 29 -

```
            }
        SELF
        {
        #
            if(row_no.VALUE == Screen1OkSelected)
            {
                row_no.OPEN = FALSE;
                row_no.COMPLETED = TRUE;
                send_UI_message(Screen1Close);
            }
        #
        }

SCREEN_2
        {
        #
            if(row_no.VALUE == Screen2Selected)
            {
                SCREEN_2.IMMEDIATE = TRUE;
            }
        #
        }

SCREEN_4
        {
        #
            if(row_no.VALUE == Screen4Selected)
            {
                SCREEN_4.IMMEDIATE = TRUE;
            }
        #
        }
NULL
ROW
SCREEN_2
    FLAGS FTFFFFFFFF
    PROC
    {
    #
        row_no.IMMEDIATE = FALSE;
        row_no.OPEN = TRUE;
        send_UI_message(Screen2Display);
    #
    }

SELF
        {
        #
            if(row_no.VALUE == Screen2OkSelected)
            {
                row_no.OPEN = FALSE;
                row_no.COMPLETED = TRUE;
                send_UI_message(Screen2Close);
            }
        #
        }
```

(NAV-SYS.E22/94-8-111)                                          PATENT
                                   - 30 -

```
        SCREEN_3
        {
        #
            if(row_no.VALUE == Screen3Selected)
  5         {
                SCREEN_3.IMMEDIATE = TRUE;
            }
        #
        }
 10  NULL
     ROW
     SCREEN_3
        FLAGS FTFFFFFFFF
        PROC
 15     {
        #
            row_no.IMMEDIATE = FALSE;
            row_no.OPEN = TRUE;
            send_UI_message(Screen3Display);
 20     #
        }

SELF
        {
        #
 25         if(row_no.VALUE == Screen3OkSelected)
            {
                row_no.OPEN = FALSE;
                row_no.COMPLETED = TRUE;
                send_UI_message(Screen3Close);
 30         }
        #
        }
     NULL
     ROW
 35  SCREEN_4
        FLAGS FTFFFFFFFF
        PROC
        {
        #
 40         row_no.IMMEDIATE = FALSE;
            row_no.OPEN = TRUE;
            send_UI_message(Screen4Display);
        #
        }

45     SELF
        {
        #
            if(row_no.VALUE == Screen4OkSelected)
            {
 50             row_no.OPEN = FALSE;
                row_no.COMPLETED = TRUE;
                send_UI_message(Screen4Close);
            }
        #
```

(NAV-SYS.E22/94-8-111)                                                    PATENT
                                    - 31 -

```
        }
        NULL

ROW
        SCREEN_5
 5         FLAGS FTFFFTFFFF1300
           PROC
           {
           #
               row_no.OPEN = TRUE;
10             send_UI_message(Screen5Display);
           #
           }

SELF
           {
15         #
               if( (row_no.VALUE == Screen6Selected) ||
                   (row_no.VALUE == Screen7Selected) )
               {
                   row_no.OPEN = FALSE;
20                 row_no.COMPLETED = TRUE;
                   send_UI_message(Screen5Close);
               }
           #
           }

25      /* User selects from either Screen 6 or Screen 7 */
        SCREEN_6
        {
        #
            if(row_no.VALUE == Screen6Selected)
30          {
                SCREEN_6.AVAILABLE = TRUE;
            }
        #
        }

35      SCREEN_7
        {
        #
            if(row_no.VALUE == Screen7Selected)
            {
40              SCREEN_7.AVAILABLE = TRUE;
            }
        #
        }

NULL

45  /* Screens 6 & 7 are REQUIRED but start with AVAILABLE flag = FALSE
    */
    ROW
    SCREEN_6
       FLAGS FFFFFTFFFF1350
50     PROC
       {
       #
```

(NAV-SYS.E22/94-8-111)                                                PATENT

- 32 -

```
            row_no.OPEN = TRUE;
            send_UI_message(Screen6Display);
         #
         }
 5    SELF
         {
         #
            if(row_no.VALUE == Screen6OkSelected)
            {
10             row_no.OPEN = FALSE;
               row_no.COMPLETED = TRUE;
               send_UI_message(Screen6Close);
            }
         #
15       }
      NULL ROW
      SCREEN_7
         FLAGS FFFFFTFFFF1375
20       PROC
         {
         #
            row_no.OPEN = TRUE;
            send_UI_message(Screen7Display);
25       #
         }

SELF
         {
         #
30          if(row_no.VALUE == Screen7OkSelected)
            {
               row_no.OPEN = FALSE;
               row_no.COMPLETED = TRUE;
               send_UI_message(Screen7Close);
35          }
         #
         }
      NULL ROW
40    SCREEN_8
         FLAGS FTFFFTFFFF1400
         PROC
         {
         #
45          row_no.OPEN = TRUE;
            send_UI_message(Screen8Display);
         #
         }

SELF
50       {
         #
```

(NAV-SYS.E22/94-8-111)                                                PATENT

```
            if(row_no.VALUE == Screen8OkSelected)
            {
               row_no.OPEN = FALSE;
  5            row_no.COMPLETED = TRUE;
               send_UI_message(Screen8Close);
               send_UI_message(EndFlow);        /* Transaction complete,
       shut down */
            }
         #
 10      }
      NULL

END
```

(NAV-SYS.E22/94-8-111)　　　　　　　　　　　　　　　　　　　　　　　　　　　PATENT

TABLE II

C CODE FOR MAP - SIMPLE TRANSACTIONAL FLOW

```
/*
 *
5    *
 *
 *
/*
 *
10   *
 *
 */ include <stdio.h>
include <string.h>

15  #include "nav_constants.h"
#include "navigator.h"
#include "JFMM_row.h"
#include "message.h"
#include "msg_constants.h"
20  #include "JFMM_std_data_msg.h"

extern int  send_UI_message();      /* matrix_util.c */
extern int  set_flag_value();  /* matrix_util.c */
extern int  set_data_value();  /* matrix_util.c */
extern int  set_global();           /* matrix_util.c */
25  extern int  my_value();        /* matrix_util.c */
extern int  my_global();            /* matrix_util.c */
extern int  my_flag();         /* matrix_util.c */ extern MATRIX matrix;

30  /*-------------------------------[ PROCESSING
    ]------------------------------*/
    int
    SCREEN_1_proc()
    {
35      char  row_no = SCREEN_1;

set_flag_value(row_no,OPEN,TRUE);
         send_UI_message(Screen1Display);

return TRUE;
    }
40  int
    SCREEN_2_proc()
    {
```

(NAV-SYS.E22/94-8-111)                                              PATENT

- 35 -

```
                char   row_no = SCREEN_2;

set_flag_value(row_no,IMMEDIATE,FALSE);
                 set_flag_value(row_no,OPEN,TRUE);
                 send_UI_message(Screen2Display);

5               return TRUE;
        }
        int
        SCREEN_3_proc()
        {
10              char   row_no = SCREEN_3;

set_flag_value(row_no,IMMEDIATE,FALSE);
                 set_flag_value(row_no,OPEN,TRUE);
                 send_UI_message(Screen3Display);

return TRUE;
15      } int
        SCREEN_4_proc()
        {
                char   row_no = SCREEN_4;

20              set_flag_value(row_no,IMMEDIATE,FALSE);
                 set_flag_value(row_no,OPEN,TRUE);
                 send_UI_message(Screen4Display);

return TRUE;
        }
25      int
        SCREEN_5_proc()
        {
                char   row_no = SCREEN_5;

set_flag_value(row_no,OPEN,TRUE);
30               send_UI_message(Screen5Display);

return TRUE;
        }
        int
        SCREEN_6_proc()
35      {
                char   row_no = SCREEN_6;

set_flag_value(row_no,OPEN,TRUE);
                 send_UI_message(Screen6Display);

return TRUE;
```

(NAV-SYS.E22/94-8-111)   PATENT

- 36 -

```
        }
        int
        SCREEN_7_proc()
        {
                char  row_no = SCREEN_7;

set_flag_value(row_no,OPEN,TRUE);
                 send_UI_message(Screen7Display);

return TRUE;
        }
        int
        SCREEN_8_proc()
        {
                char  row_no = SCREEN_8;

set_flag_value(row_no,OPEN,TRUE);
                 send_UI_message(Screen8Display);

return TRUE;
        }
        /*-----------------------------[ INTERACTIONS
        ]-----------------------------*/
        int
        SCREEN_1_SCREEN_1_inter()
        {
                char  row_no = SCREEN_1;

if(my_value(row_no,Screen1OkSelected))
                {
                        set_flag_value(row_no,OPEN,FALSE);
                        set_flag_value(row_no,COMPLETED,TRUE);
                        send_UI_message(Screen1Close);
                } return TRUE;
        }
        int
        SCREEN_1_SCREEN_2_inter()
        {
                char  row_no = SCREEN_1;

if(my_value(row_no,Screen2Selected))
                {
                        set_flag_value(SCREEN_2,IMMEDIATE,TRUE);
                }
```

(NAV-SYS.E22/94-8-111)  PATENT

- 37 -

```
                return TRUE;
        }
        int
        SCREEN_1_SCREEN_4_inter()
        {
                char   row_no = SCREEN_1;

if(my_value(row_no,Screen4Selected))

{
                        set_flag_value(SCREEN_4,IMMEDIATE,TRUE);
                } return TRUE;
        } int
        SCREEN_2_SCREEN_2_inter()
        {
                char   row_no = SCREEN_2;

if(my_value(row_no,Screen2OkSelected))

{
                        set_flag_value(row_no,OPEN,FALSE);
                        set_flag_value(row_no,COMPLETED,TRUE);
                        send_UI_message(Screen2Close);

} return TRUE;
        } int
        SCREEN_2_SCREEN_3_inter()
        {
                char   row_no = SCREEN_2;

if(my_value(row_no,Screen3Selected))

{
                        set_flag_value(SCREEN_3,IMMEDIATE,TRUE);
                } return TRUE;
        } int
        SCREEN_3_SCREEN_3_inter()
        {
                char   row_no = SCREEN_3;

if(my_value(row_no,Screen3OkSelected))

{
```

(NAV-SYS.E22/94-8-111)  PATENT

- 38 -

```
                set_flag_value(row_no,OPEN,FALSE);
                set_flag_value(row_no,COMPLETED,TRUE);
                send_UI_message(Screen3Close);
        } return TRUE;
} int
SCREEN_4_SCREEN_4_inter()
{
        char  row_no = SCREEN_4;

if(my_value(row_no,Screen4OkSelected))

{
                set_flag_value(row_no,OPEN,FALSE);
                set_flag_value(row_no,COMPLETED,TRUE);
                send_UI_message(Screen4Close);

} return TRUE;
} int
SCREEN_5_SCREEN_5_inter()
{
        char  row_no = SCREEN_5;

if( (my_value(row_no,Screen6Selected)) ||
(my_value(row_no,Screen7Selected)) )

{
                set_flag_value(row_no,OPEN,FALSE);
                set_flag_value(row_no,COMPLETED,TRUE);
                send_UI_message(Screen5Close);

} return TRUE;
} int
SCREEN_5_SCREEN_6_inter()
{
        char  row_no = SCREEN_5;

if(my_value(row_no,Screen6Selected))

{
                set_flag_value(SCREEN_6,AVAILABLE,TRUE);

} return TRUE;
}
```

(NAV-SYS.E22/94-8-111)                                              PATENT

- 39 -

```
    int
    SCREEN_5_SCREEN_7_inter()
    {
            char  row_no = SCREEN_5;
 5          if(my_value(row_no,Screen7Selected))
            {
                    set_flag_value(SCREEN_7,AVAILABLE,TRUE);
            }
10          return TRUE;
    } int
    SCREEN_6_SCREEN_6_inter()
    {
15          char  row_no = SCREEN_6;

if(my_value(row_no,Screen6OkSelected))

{
                    set_flag_value(row_no,OPEN,FALSE);
                    set_flag_value(row_no,COMPLETED,TRUE);
20                  send_UI_message(Screen6Close);
            } return TRUE;
    }
25  int
    SCREEN_7_SCREEN_7_inter()
    {
            char  row_no = SCREEN_7;

if(my_value(row_no,Screen7OkSelected))
30          {
                    set_flag_value(row_no,OPEN,FALSE);
                    set_flag_value(row_no,COMPLETED,TRUE);
                    send_UI_message(Screen7Close);
35          }
            return TRUE;
    }
    int
    SCREEN_8_SCREEN_8_inter()
40  {
            char  row_no = SCREEN_8;

if(my_value(row_no,Screen8OkSelected))

{
                    set_flag_value(row_no,OPEN,FALSE);
```

(NAV-SYS.E22/94-8-111)                                                    PATENT

- 40 -

```
                set_flag_value(row_no,COMPLETED,TRUE);
                send_UI_message(Screen8Close);
                send_UI_message(EndFlow);
                /* Transaction complete , shut down */
   5        } return TRUE;
}
/*-----------------------------[ matrix_fns.c
]-----------------------------*/
```

Figure 12:
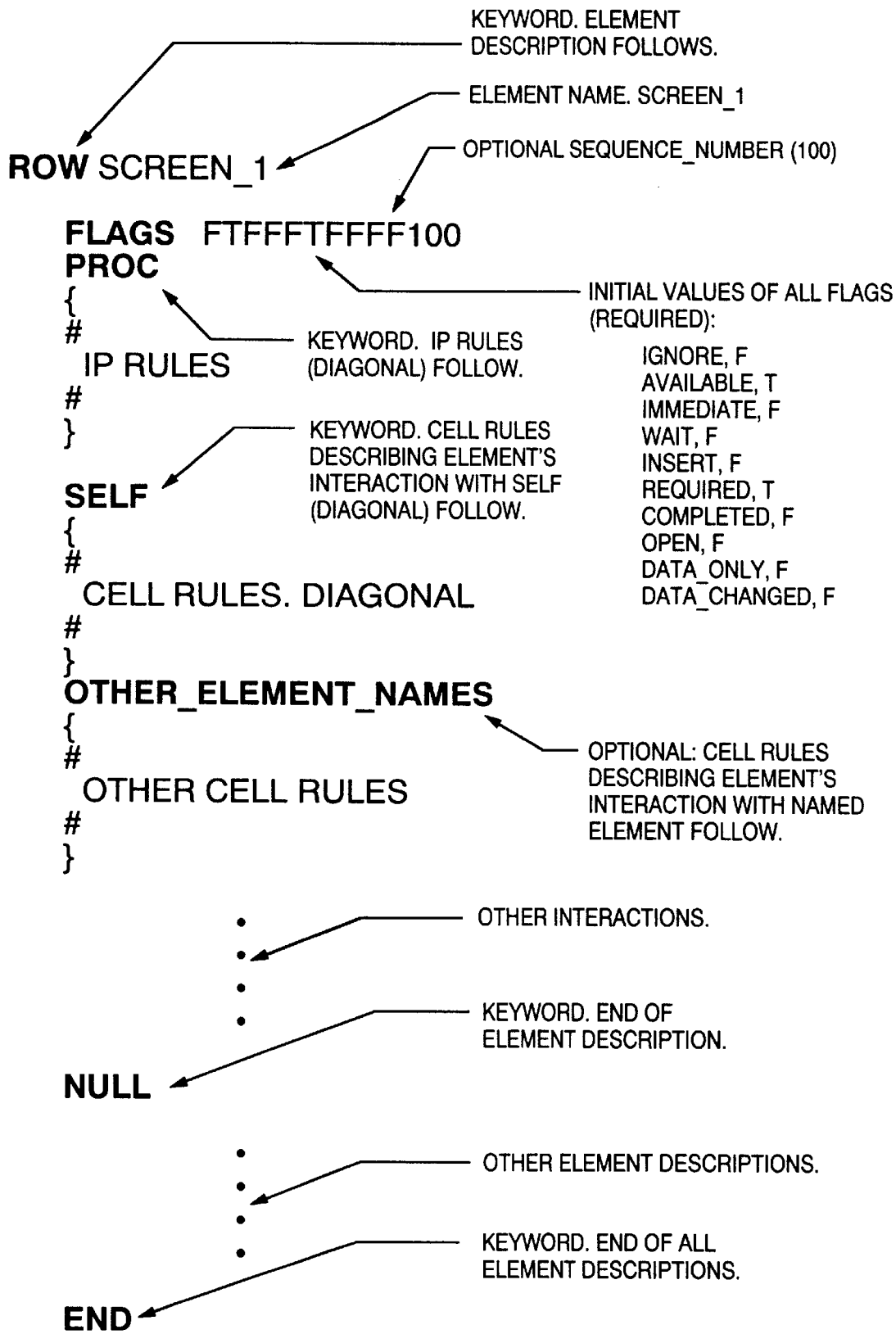
FIG. 12 schematically illustrates the MAP language description of matrix elements including the structure of the language and the keywords recognized by MAP as well as their meaning.

The first element described in this file is Screen_1. It is used as an example to illustrate basic behaviors. The basic structure and keywords of an element description are illustrated in FIG. 12, which uses Screen_1 as an example. The keywords ROW, FLAGS, PROC, SELF and NULL must appear. ROW is followed by the element's name, SCREEN_1 in this case. FLAGS is followed by a list of the flag's initial values in the order shown. All rule sets are preceded by the characters "{" and "#". Rule sets are ended with "#" followed by "}". The keyword PROC precedes the IP rules and the keyword SELF designates that cell rules on the diagonal cell follow (i.e. the element's influence on itself). All other cell rules (if they exist) are preceded by the name of the element which they influence. The keyword NULL ends the element description and the keyword END designates the end of all element descriptions for the entire matrix. Within the description of an element, the term "row_no" is a shorthand substitute for the element name.

TABLE I illustrates the various behaviors of Screen_1 and its impact on other elements. The IP rules send a message to the UI to display the screen and set its OPEN flag to TRUE. Messages are identified by a noun-verb pair such as Screen1Display. Recall that the IP rules are fired when the the SCREEN_1 element (Screen_1) is discovered to be the active element by the Matrix Scan Rules. So, when SCREEN_1 becomes active (by MSR_3 in this case because it is the first required screen), Screen_1 is displayed. This is the first thing which happens in the transactional flow.

The next events are the result of the user pressing buttons on Screen_1 and the actions associated with these events are expressed in the cell rules. The cell rules shown under SELF (the diagonal cell rules or the element's influence on itself) indicate that if the user presses the Ok button, a message is sent to the UI to close Screen_1. Also, the OPEN flag is set FALSE and the COMPLETED flag is set TRUE. The impact of this latter action is that the Matrix Scan Rules will no longer find the SCREEN_1 element, i.e., Screen_1 is completed. All things being equal, the Matrix Scan Rules will find the next required screen in the flow (via MSR_3) which is Screen_5 in this example.

Figure 3:
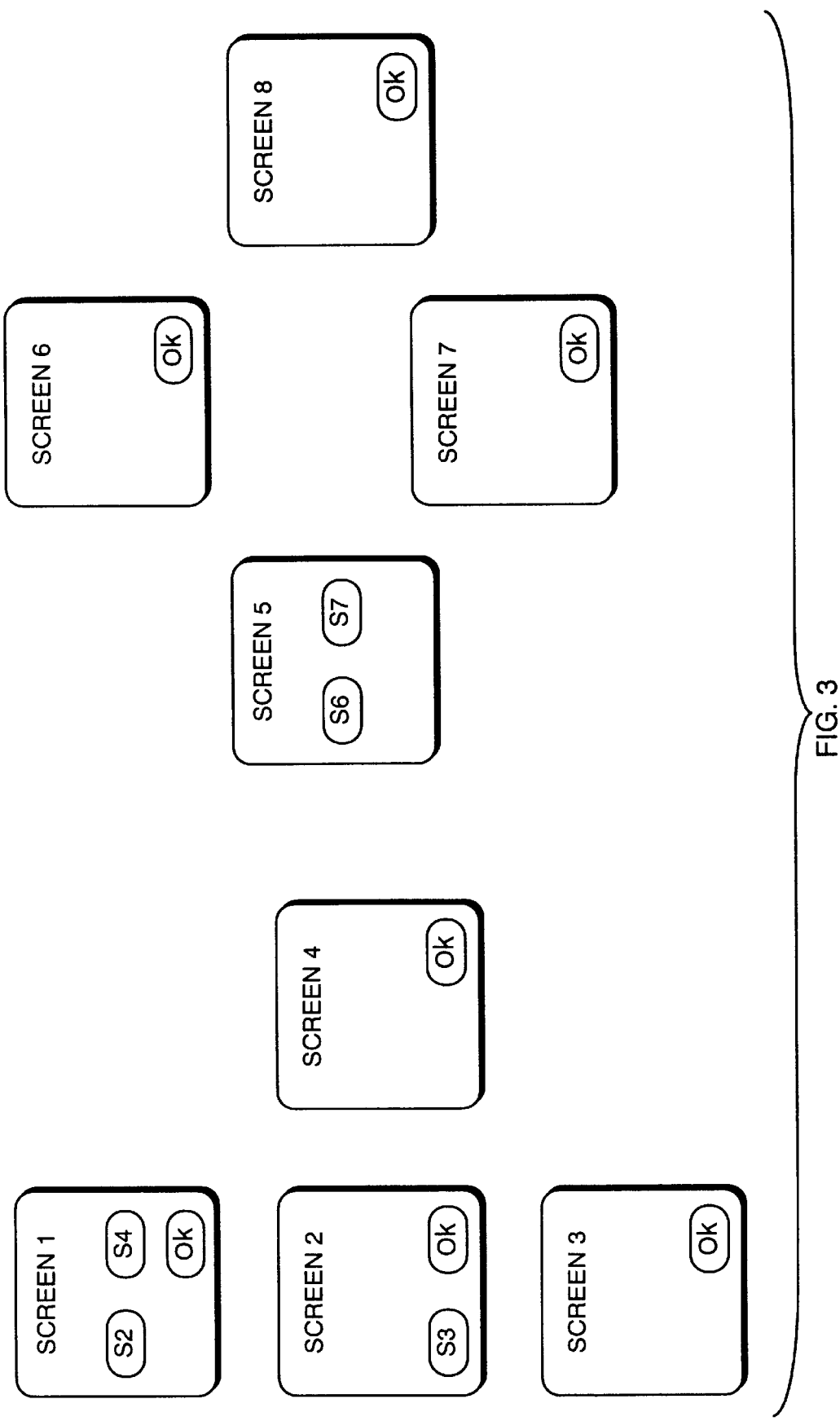
FIG. 3 schematically illustrates the screens of FIG. 2.
Figure 4:
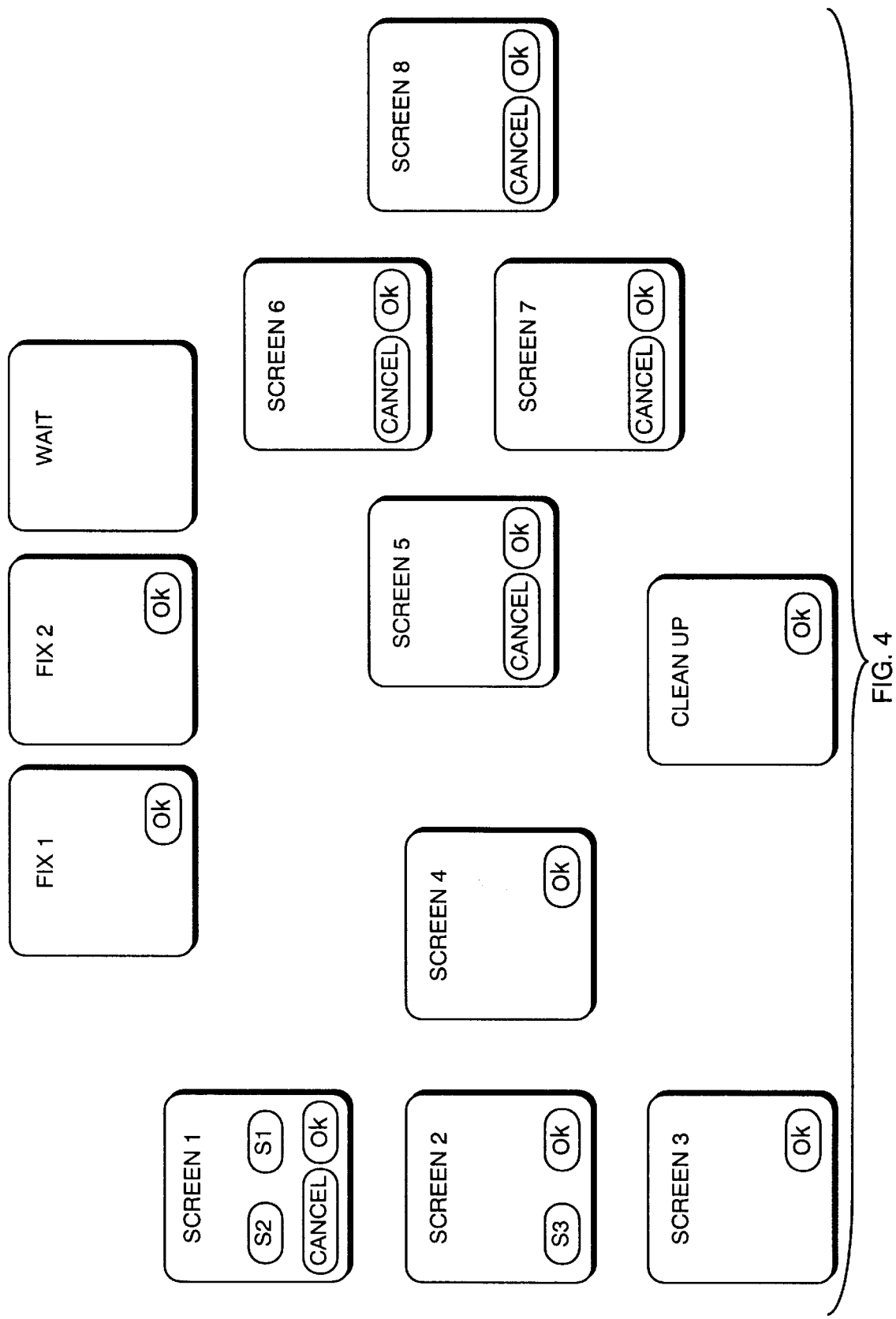
FIG. 4 schematically illustrates the screens of FIG. 5.

If the user presses the S2 button (FIG. 3), the UI sends a message from its button callback routine to NAV. The message content (Screen2Selected) is loaded into element SCREEN_1's data value switching its DATA_CHANGED flag to TRUE. Following the Navigational Algorithm, Resolve Rules is executed next and the element's entire row is checked for cell rules which can fire (running the row). The cell rule which influences the SCREEN_2 row is activated which turns on the IMMEDIATE flag for the element SCREEN_2. This action sets the stage for the Matrix Scan Rules which are run next. In this case, MSR_1 finds SCREEN_2 and fires its IP rules.

The ultimate effect of all this is that Screen_2 appears along with Screen_1 as desired. The code for Screen_2 appears in TABLE II. When the user presses the Screen_2 "Ok" button, the Screen2OkSelected message is received by NAV which fires the SELF rule for Screen_2 closing the screen and toggling the OPEN flag to FALSE. NAV also sends a message to the UI to close Screen_2 leaving Screen_1 still open. MSR_2 will continually find the SCREEN_1 element (because it is open and not completed) until the user presses the Screen_1 Ok button.

If the user presses the S3 button while Screen_2 is displayed, Screen_3 appears via the same mechanism that brought up Screen_2. The result would be all three screens displayed simultaneously.

Once the user presses the Ok button on Screen_1, the SELF rules are fired closing the screen, setting its COMPLETED flag to TRUE and setting its OPEN flag to FALSE. Now MSR_3 finds Screen_5 as the next required screen and its IP rules take care of displaying it and setting appropriate flags.

If the user presses either the S6 or S7 button on Screen_5, its SELF rules take care of closing the screen and setting appropriate flags. In addition to SELF rules, the SCREEN_5 element has interactions with the SCREEN_6 AND SCREEN_7 elements. Only one of these rules fires depending on which button was pressed by the user in Screen_5. For example, if the user pressed the S7 button, the cell rule for the interaction of element SCREEN_5 with SCREEN_7 would fire setting the SCREEN7.AVAILABLE flag to true.

Now, when the MSRs search for the next active element, MSR 3 will find SCREEN_7 because it meets all of the necessary conditions. Both SCREEN 6 and SCREEN 7 are started with their REQUIRED flags set to TRUE and their AVAILABLE flags set to FALSE. The latter condition keeps either of them from becoming the active element until the cell rule (interaction of SCREEN 5 with SCREEN 7) sets the appropriate AVAILABLE flag.

After the user presses the Ok button on Screen_7, Screen_8 appears and the flow finally ends as this screen is closed. The SCREEN_8 element SELF rule sends a special message to the UI indicating that the transaction is over— send_UI_Message(EndFlow). The rules encountered thus far and through the rest of this matrix in TABLE I indicate some obvious patterns, for example:

IP rules generally display the element's associated screen.

At least one rule is required for every message from the UI.

Required screens are numbered in their preferred order of appearance so that MPR_3 finds them in that order. Conversely, changing an element's sequence number relative to that of other elements changes its order of appearance. This feature along with the IGNORE flag can be used to great advantage to allow local user customization.

Non-Required screens are made accessible (capable of being found) to the MSRs using the IMMEDIATE flag.

Choice points (e.g., Screen_5 to either Screen_6 or Screen_7) can readily be handled as shown above, but can also be handled using other flags such as the INSERT flag.

Further inspection of the foregoing example illustrates how the Navigational Algorithm works with the Matrix Scan Rules and Resolve Matrix Rules to achieve the desired navigational capability and how knowledge of all three of these algorithms is esential to correctly write IP and cell rules.

Complex Navigation

Figure 13:
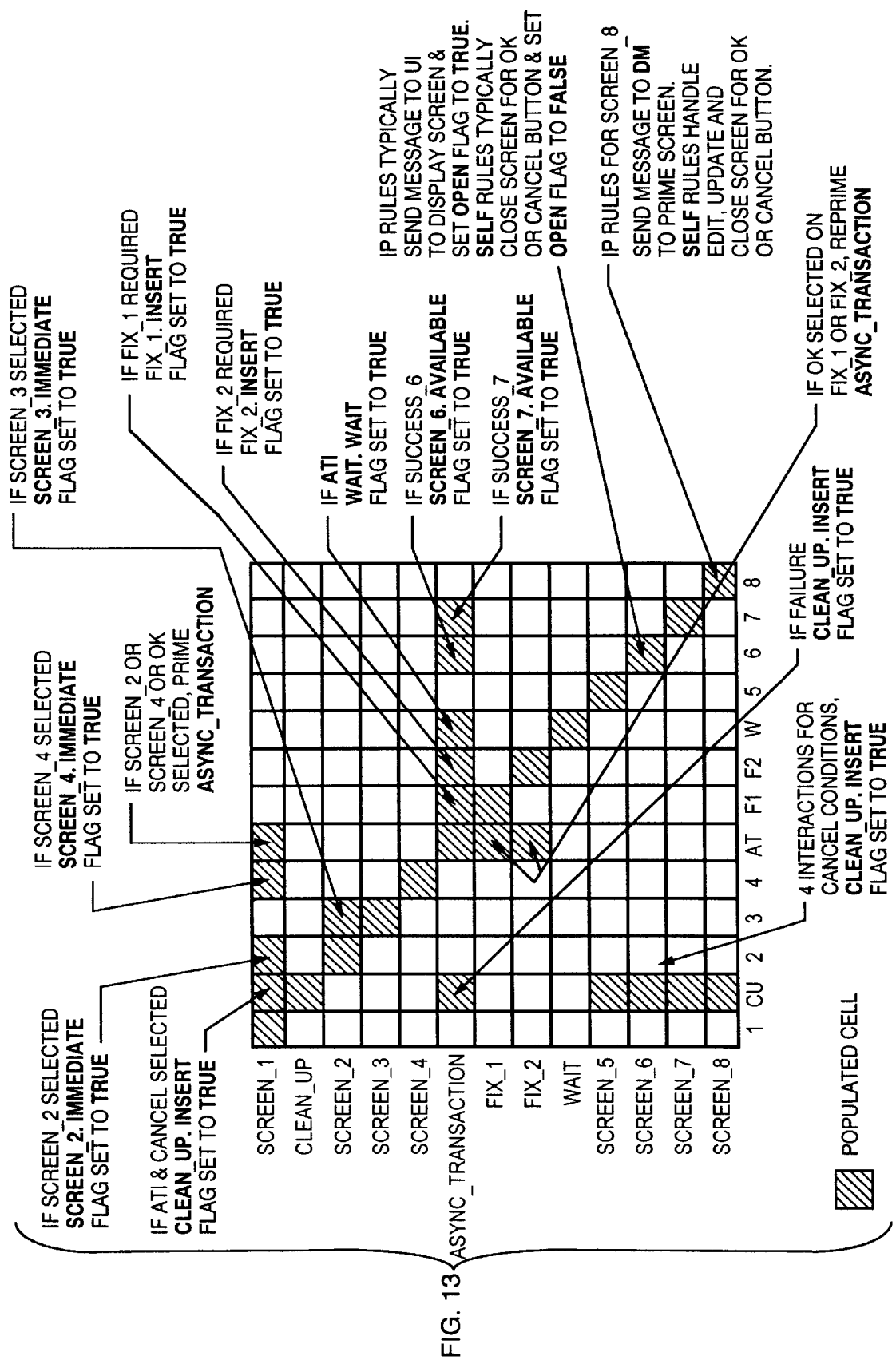
FIG. 13 pictorially illustrates the interactions and cell rules for a complex navigational case.

Interactions for the complex navigation example are shown in FIG. 13. The code describing the IP rules and cell rules is shown in TABLE III. TABLE IV contains the associated C functions for IP and cell rules after translation by MAP. As previously indicated, this example includes thirteen elements, one for each screen in the flow and one additional element for the status of Async_Transaction flow.

(NAV-SYS.E22/94-8-111)                                              PATENT

```
                       set_flag_value(row_no,INSERT,FALSE);
                        set_flag_value(row_no,OPEN,TRUE);
                        send_UI_message(CleanupDisplay);

return TRUE;
 5      }
        int
        SCREEN_2_proc()
        {
                char    row_no = SCREEN_2;

10                     set_flag_value(row_no,IMMEDIATE,FALSE);
                        set_flag_value(row_no,OPEN,TRUE);
                        send_UI_message(Screen2Display);

return TRUE;
        }
15      int
        SCREEN_3_proc()
        {
                char    row_no = SCREEN_3;

set_flag_value(row_no,IMMEDIATE,FALSE);
20                      set_flag_value(row_no,OPEN,TRUE);
                        send_UI_message(Screen3Display);

return TRUE;
        }
        int
25      SCREEN_4_proc()
        {
                char    row_no = SCREEN_4;

set_flag_value(row_no,IMMEDIATE,FALSE);
                        set_flag_value(row_no,OPEN,TRUE);
30                      send_UI_message(Screen4Display);

return TRUE;
        }
        int
        ASYNC_TRANSACTION_proc()
35      {
                char    row_no = ASYNC_TRANSACTION;

return TRUE;
        }
        int
```

(NAV-SYS.E22/94-8-111)                                           PATENT

```
FIX_1_proc()
{
        char   row_no = FIX_1;

set_flag_value(row_no,INSERT,FALSE);
        set_flag_value(row_no,OPEN,TRUE);
        send_UI_message(Fix1Display);

return TRUE;
} int
FIX_2_proc()
{
        char   row_no = FIX_2;

set_flag_value(row_no,INSERT,FALSE);
        set_flag_value(row_no,OPEN,TRUE);
        send_UI_message(Fix2Display);

return TRUE;
} int
WAIT_proc()
{
        char   row_no = WAIT;

set_flag_value(row_no,OPEN,TRUE);
        send_UI_message(WaitDisplay);

return TRUE;
} int
SCREEN_5_proc()
{
        char   row_no = SCREEN_5;

set_flag_value(row_no,OPEN,TRUE);
        send_UI_message(Screen5Display);

return TRUE;
} int
SCREEN_6_proc()
{
        char   row_no = SCREEN_6;

set_flag_value(row_no,OPEN,TRUE);
        send_UI_message(Screen6Display);
```

(NAV-SYS.E22/94-8-111)  PATENT

- 59 -

```
                return TRUE;
        }
        int
        SCREEN_7_proc()
 5      {
                char    row_no = SCREEN_7;

set_flag_value(row_no,OPEN,TRUE);
                 send_UI_message(Screen7Display);

return TRUE;
10      } int
        SCREEN_8_proc()
        {
                char    row_no = SCREEN_8;

15              set_flag_value(row_no,OPEN,TRUE);
                 send_DM_message(Screen8Prime);

return TRUE;
        }
        /*----------------------------[ INTERACTIONS
20      ]----------------------------*/
        int
        SCREEN_1_SCREEN_1_inter()
        {
                char    row_no = SCREEN_1;

25              if(my_value(row_no,Screen1CancelSelected))

{
                        set_flag_value(row_no,OPEN,FALSE);
                        set_flag_value(row_no,COMPLETED,TRUE);
                        send_UI_message(Screen1Close);
30                      send_UI_message(EndFlow);
                        /* shut down */
                }
                 if(my_value(row_no,Screen1OkSelected))

{
35                      set_flag_value(row_no,OPEN,FALSE);
                        set_flag_value(row_no,COMPLETED,TRUE);
                        send_UI_message(Screen1Close);

}

40              return TRUE;
        }
        int
        SCREEN_1_SCREEN_2_inter()
```

(NAV-SYS.E22/94-8-111)                                              PATENT

- 60 -

```
     {
         char  row_no = SCREEN_1;

if(my_value(row_no,Screen2Selected))

{
5                set_flag_value(SCREEN_2,IMMEDIATE,TRUE);

} return TRUE;
     }
10   int
     SCREEN_1_SCREEN_4_inter()
     {
         char  row_no = SCREEN_1;

if(my_value(row_no,Screen4Selected))

15       {
                 set_flag_value(SCREEN_4,IMMEDIATE,TRUE);

} return TRUE;
20   } int
     SCREEN_1_ASYNC_TRANSACTION_inter()
     {
         char  row_no = SCREEN_1;

25       if( ( (my_value(row_no,Screen1OkSelected)) || /* User presses
     S1 , S2 or S4 buttons and */   (my_value(row_no,Screen2Selected)) ||
     (my_value(row_no,Screen4Selected)) ) &&
     (my_value(ASYNC_TRANSACTION,NIL)) ) /* have not started Async
     Transaction , */

30       {
                 set_data_value(ASYNC_TRANSACTION,SEND);
                 /* then get it ready to go */
         } return TRUE;
35   } int
     SCREEN_1_CLEAN_UP_inter()
     {
         char  row_no = SCREEN_1;

40       if( (my_value(row_no,Screen1CancelSelected)) && /* User cancels
     , Async Transaction started */   (!my_value(ASYNC_TRANSACTION,NIL)) )

{
                 set_flag_value(CLEAN_UP,INSERT,TRUE);
                 /* then bring in Cleanup */
```

(NAV-SYS.E22/94-8-111)                                              PATENT

- 61 -

```
                } return TRUE;
        }
        int
 5      CLEAN_UP_CLEAN_UP_inter()
        {
                char   row_no = CLEAN_UP;

if(my_value(row_no,CleanupOkSelected))

{
10                      set_flag_value(row_no,OPEN,FALSE);
                        set_flag_value(row_no,COMPLETED,TRUE);
                        send_UI_message(CleanupClose);
                        send_UI_message(EndFlow);
                        /* shut down */
15              } return TRUE;
        } int
        SCREEN_2_SCREEN_2_inter()
20      {
                char   row_no = SCREEN_2;

if(my_value(row_no,Screen2OkSelected))

{
                        set_flag_value(row_no,OPEN,FALSE);
25                      set_flag_value(row_no,COMPLETED,TRUE);
                        send_UI_message(Screen2Close);

} return TRUE;
30      } int
        SCREEN_2_SCREEN_3_inter()
        {
                char   row_no = SCREEN_2;

35              if(my_value(row_no,Screen3Selected))

{
                        set_flag_value(SCREEN_3,IMMEDIATE,TRUE);

}
40              return TRUE;
        } int
        SCREEN_3_SCREEN_3_inter()
        {
```

(NAV-SYS.E22/94-8-111)                                                    PATENT

- 62 -

```
            char  row_no = SCREEN_3;

if(my_value(row_no,Screen3OkSelected))

{
                    set_flag_value(row_no,OPEN,FALSE);
  5                 set_flag_value(row_no,COMPLETED,TRUE);
                    send_UI_message(Screen3Close);

} return TRUE;
 10     } int
        SCREEN_4_SCREEN_4_inter()
        {
            char  row_no = SCREEN_4;

15         if(my_value(row_no,Screen4OkSelected))

{
                    set_flag_value(row_no,OPEN,FALSE);
                    set_flag_value(row_no,COMPLETED,TRUE);
                    send_UI_message(Screen4Close);
 20
            } return TRUE;
        } int
 25     ASYNC_TRANSACTION_ASYNC_TRANSACTION_inter()
        {
            char  row_no = ASYNC_TRANSACTION;

if(my_value(row_no,SEND))  /* need to start Async Transaction */

{
 30                 send_ASYNC_TRANSACTION_message(row_no,
        AsyncTransactionBegin);
                    set_data_value(row_no,SENT);

}

35         return TRUE;
        } int
        ASYNC_TRANSACTION_WAIT_inter()
        {
 40         char  row_no = ASYNC_TRANSACTION;

if( (my_value(row_no,SEND)) || (my_value(row_no,SENT)) )  /*
        i.e. still out there with Transaction */

{
```

(NAV-SYS.E22/94-8-111) PATENT

- 63 -

```
                set_flag_value(WAIT,WAIT,TRUE);
        }
                else if( (my_value(row_no,Fix1Required)) || /* i.e. anything
        back */   (my_value(row_no,Fix2Required)) ||
        (my_value(row_no,Success6)) || (my_value(row_no,Success7)) ||
        (my_value(row_no,Failure)) )
        {
                set_data_value(WAIT,KILL);
        } return TRUE;
} int
ASYNC_TRANSACTION_SCREEN_6_inter()
{
        char  row_no = ASYNC_TRANSACTION;

if(my_value(row_no,Success6))
        {
                set_flag_value(SCREEN_6,AVAILABLE,TRUE);
        } return TRUE;
} int
ASYNC_TRANSACTION_SCREEN_7_inter()
{
        char  row_no = ASYNC_TRANSACTION;

if(my_value(row_no,Success7))
        {
                set_flag_value(SCREEN_7,AVAILABLE,TRUE);
        } return TRUE;
} int
ASYNC_TRANSACTION_FIX_1_inter()
{
        char  row_no = ASYNC_TRANSACTION;

if(my_value(row_no,Fix1Required))
        {
                set_flag_value(FIX_1,INSERT,TRUE);
        }
```

(NAV-SYS.E22/94-8-111)                                          PATENT

- 64 -

```
            return TRUE;
    }
    int
    ASYNC_TRANSACTION_FIX_2_inter()
    {
            char   row_no = ASYNC_TRANSACTION;

if(my_value(row_no,Fix2Required))

{
                    set_flag_value(FIX_2,INSERT,TRUE);
            } return TRUE;
    }
    int
    ASYNC_TRANSACTION_CLEAN_UP_inter()
    {
            char   row_no = ASYNC_TRANSACTION;

if(my_value(row_no,Failure))

{
                    set_flag_value(CLEAN_UP,INSERT,TRUE);
            } return TRUE;
    }
    int
    FIX_1_FIX_1_inter()
    {
            char   row_no = FIX_1;

if(my_value(row_no,Fix1OkSelected))

{
                    set_flag_value(row_no,OPEN,FALSE);
                    send_UI_message(Fix1Close);
            } return TRUE;
    }
    int
    FIX_1_ASYNC_TRANSACTION_inter()
    {
            char   row_no = FIX_1;

if(my_value(row_no,Fix1OkSelected)) /* User presses Ok button
    */
            {
```

(NAV-SYS.E22/94-8-111)                                                PATENT

- 65 -

```
                        set_data_value(ASYNC_TRANSACTION,SEND);
                        /* then get it ready to go again */
                }
                return TRUE;
 5      } int
        FIX_2_FIX_2_inter()
        {
                char   row_no = FIX_2;

10              if(my_value(row_no,Fix2OkSelected))

{
                        set_flag_value(row_no,OPEN,FALSE);
                        send_UI_message(Fix2Close);
15              } return TRUE;
        } int
        FIX_2_ASYNC_TRANSACTION_inter()
20      {
                char   row_no = FIX_2;

if(my_value(row_no,Fix2OkSelected))  /* User presses Ok button
        */
                {
25                      set_data_value(ASYNC_TRANSACTION,SEND);
                        /* then get it ready to go again */
                }
                return TRUE;
        }

30      int
        WAIT_WAIT_inter()
        {
                char   row_no = WAIT;

if(my_value(row_no,KILL))
35              {
                        set_flag_value(row_no,WAIT,FALSE);
                        if(my_flag(row_no,OPEN) == TRUE)

{
                            set_flag_value(row_no,OPEN,FALSE);
40                          send_UI_message(WaitClose);
                        }

}
```

(NAV-SYS.E22/94-8-111)                                         PATENT

```
                return TRUE;
        }
        int
        SCREEN_5_SCREEN_5_inter()
  5     {
                char   row_no = SCREEN_5;

if(my_value(row_no,Screen5CancelSelected))

{
                        set_flag_value(row_no,OPEN,FALSE);
 10                     send_UI_message(Screen5Close);

}
                 if(my_value(row_no,Screen5OkSelected))

{
 15                     set_flag_value(row_no,OPEN,FALSE);
                        set_flag_value(row_no,COMPLETED,TRUE);
                        send_UI_message(Screen5Close);

}

20             return TRUE;
        } int
        SCREEN_5_CLEAN_UP_inter()
        {
 25             char   row_no = SCREEN_5;

if( (my_value(row_no,Screen5CancelSelected)) &&
        (!my_value(ASYNC_TRANSACTION,NIL)) )

{
                        set_flag_value(CLEAN_UP,INSERT,TRUE);
 30             } return TRUE;
        } int
 35     SCREEN_6_SCREEN_6_inter()
        {
                char   row_no = SCREEN_6;

if(my_value(row_no,Screen6CancelSelected))

{
 40                     set_flag_value(row_no,OPEN,FALSE);
                        send_UI_message(Screen6Close);

}
                 if(my_value(row_no,Screen6OkSelected))

45             {
```

(NAV-SYS.E22/94-8-111)  PATENT

- 67 -

```
                        set_flag_value(row_no,OPEN,FALSE);
                        set_flag_value(row_no,COMPLETED,TRUE);
                        send_UI_message(Screen6Close);
 5              } return TRUE;
        }
        int
        SCREEN_6_CLEAN_UP_inter()
10      {
                char    row_no = SCREEN_6;

if( (my_value(row_no,Screen6CancelSelected)) &&
        (!my_value(ASYNC_TRANSACTION,NIL)) )
                {
15                      set_flag_value(CLEAN_UP,INSERT,TRUE);

} return TRUE;
        }
20      int
        SCREEN_7_SCREEN_7_inter()
        {
                char    row_no = SCREEN_7;

if(my_value(row_no,Screen7CancelSelected))
25              {
                        set_flag_value(row_no,OPEN,FALSE);
                        send_UI_message(Screen7Close);

}
30               if(my_value(row_no,Screen7OkSelected))

{
                        set_flag_value(row_no,OPEN,FALSE);
                        set_flag_value(row_no,COMPLETED,TRUE);
                        send_UI_message(Screen7Close);
35              } return TRUE;
        }
        int
40      SCREEN_7_CLEAN_UP_inter()
        {
                char    row_no = SCREEN_7;

if( (my_value(row_no,Screen7CancelSelected)) &&
        (!my_value(ASYNC_TRANSACTION,NIL)) )
45              {
```

(NAV-SYS.E22/94-8-111)  PATENT

- 68 -

```
                set_flag_value(CLEAN_UP,INSERT,TRUE);
        }
        return TRUE;
 5  }
    int
    SCREEN_8_SCREEN_8_inter()
    {
        char   row_no = SCREEN_8;
10      if(my_value(row_no,Screen8Primed))
        {
                send_UI_message(Screen8Display);
        }
15       if(my_value(row_no,Screen8CancelSelected))
        {
                set_flag_value(row_no,OPEN,FALSE);
                send_UI_message(Screen8Close);
20      }
         if(my_value(row_no,Screen8OkSelected))
        {
                send_EDITOR_message(row_no, Screen8Edit);
25      }
         if(my_value(row_no,Screen8Edited))
        {
                send_DM_message(row_no, Screen8Update);
30      }
         if(my_value(row_no,Screen8Updated))
        {
                set_flag_value(row_no,OPEN,FALSE);
                set_flag_value(row_no,COMPLETED,TRUE);
35              send_UI_message(Screen8Close);
                send_UI_message(EndFlow);
                /* Transaction complete , shut down */
        }
        return TRUE;
40  }
    int
    SCREEN_8_CLEAN_UP_inter()
    {
        char   row_no = SCREEN_8;
45      if( (my_value(row_no,Screen8CancelSelected)) &&
    (!my_value(ASYNC_TRANSACTION,NIL)) )
```

(NAV-SYS.E22/94-8-111)  PATENT

- 69 -

```
        {
               set_flag_value(CLEAN_UP,INSERT,TRUE);
        }
5       return TRUE;
}
/*-------------------------------[ matrix_fns.c
]-----------------------------*/
```

In order to handle cancellation after the start of Async_Transaction or the failure of Async_Transaction, the Clean Up screen (with corresponding CLEAN_UP element) has been added. This screen is made a candidate for selection by MSR_3 when necessary by setting its INSERT flag to true as shown by a number of the cell rules in FIG. 13. These rules are relatively easy to find because they all lie on the column marked CU. Like SCREEN_8, the CLEAN_UP element uses the EndFlow message to indicate the end of the transaction.

The interactions between Screen_1 and its children screens are the same as they were in the simple example. In addition, Screen_1 now has an interaction with Async_Transaction which occurs when any of the Screen_1 buttons are pushed and Async_Transaction has not yet been sent (i.e., ASYNC_TRANSACTION.VALUE ==NIL). In essence, this action primes Async_Transaction to begin by setting ASYNC_TRANSACTION.VALUE to SEND. This requires the ASYNC_TRANSACTION row to be run, which fires a SELF rule to begin the transaction. In other words, send_ASYNC_TRANSACTION_message(row_no, AsuncTransactionBegin); The same rule sets ASYNC_TRANSACTION.VALUE to SENT, thus establishing that the transaction has begun. Similarly, results from Async_Transaction fire other interaction rules in the ASYNC_TRANSACTION row to enable Fix_1, Fix_2, Wait and Clean_Up to appear when and if they are necessary. The behavior of these screens is manipulated with their INSERT flags as shown by the appropriate cell rules. The sequence numbers of these screens is chosen to be lower than the first required screen after completion of Async_Transaction so that MSR_3 will find them first as required.

Screens 6 and 7 are enabled with their respective AVAILABLE flags depending on the results of Async_Transaction (Success_6 or Success_7). Screen_5 is found by the MSR_3 as the next required screen in the flow. It is notable that no specific cell rule is necessary to accomplish this action.

Screens Fix_1 and Fix_2 re-initiate Async_Transaction via cell rules which fire after their respective Ok buttons are pressed. This is accomplished in the same way the SCREEN_1 element initiates the transaction. The rule to enable the Wait screen behaves similarly to rules which manipulate the INSERT flags of other elements.

Since Screen_8 is primed from a database, this action occurs via the IP rules, and actual display of the screen is delayed until the screen priming data has been successfully accessed. Thus, in the SELF rules, the rule to display the screen fires upon receipt of the Screen8Primed message from the Data Manipulator (DM). The SELF rules also handle the editing and updating scenarios in a similar manner.

In summary, the present invention is a rule-based system, employed in a client/server environment, for the provision of complex navigational logic in an application comprises a Navigation Analysis Vehicle ("NAV") and a Matrix Analysis Package ("MAP"). The MAP facilitates creation of navigation rules for linkage with the rest of the application. In a preferred embodiment of the invention, the NAV communicates navigational instructions to a user interface for the display and the take-down of screens, and also communicates with other processes such as editors and data manipulators. After the navigation rules are created, those rules are then applied to provide navigational logic for the user interface for processing the user interface screens. MAP creates the navigation rules in a user-friendly, C-like language and parses them into ANSI-standard C language for linkage with other processes that control the user interface.

The present invention has been described above with reference to a preferred embodiment. However, those skilled in the art will recognize that changes and modifications may be made in this preferred embodiment without departing from the scope of the present invention. For example, although the exemplary embodiment of NAV relates to the provision of navigational logic for UIs in an X-Windows environment, the technique can be extended to other environments. Further, the technique can handle field-to-field navigation as well as the screen-to-screen navigation disclosed. These and other changes and modifications, which are obvious to those skilled in the art, are intended to be circumscribed by the scope of the present invention. Variations may be made in the construction, arrangement or operation of the elements of the various embodiments as disclosed herein without departing from the spirit and scope of the invention as defined in the following claims.

What is claimed is:

1. In a system for processing an application in a client/server environment, a controller associated with said application for managing presentation of a multiplicity of screen displays at a user interface of a client, said controller coupled to said client and programmed to:

receive messages from said client;

process said messages, in accordance with a predetermined set of navigation rules associated with said application, to establish a sequence by which selected ones of said multiplicity of screen displays are to be exhibited at said user interface; and transmit corresponding messages to said client in accordance with said sequence.

2. The system as claimed in claim 1, wherein each of said received messages comprises an element to which said received message is addressed.

3. The system as claimed in claim 2, wherein said element is associated with a data value.

4. The system as claimed in claim 1, wherein said predetermined set of navigation rules includes a set of Resolve Rules and a set of Matrix Scan Rules.

5. The system as claimed in claim 4, wherein said Resolve Rules comprise the steps of:

adding elements to a list of DATA-CHANGED elements;

determining whether a predetermined number of iterations in executing said Resolve Rules has been reached;

if said predetermined number of iterations has been reached, terminating executing of said Resolve Rules;

if said predetermined number of iterations has not been reached, removing the first element from said list and resetting the DATA-CHANGED Flag to FALSE;

running said element's row;

determining whether any other element's data value has changed, and if so, running said other element's row; and if no element's data value has changed, terminating execution of said Resolve Rules.

6. The system as claimed in claim 4, wherein said Matrix Scan Rules comprise the steps of:

searching for an immediate element;

if said immediate element is found, terminating execution of said Matrix Scan rules;

if said immediate element is not found, identifying a first set of elements whose flags are not: IGNORE, AVAILABLE, and IMMEDIATE, and selecting from said first set of elements the element with the lowest sequence number;

searching for an open element;

if the open element is found, terminating execution of said Matrix Scan rules;

identifying a second set of elements whose flags are not: IGNORE, AVAILABLE, OPEN, and not COMPLETED, and selecting from said second set of elements the element with the lowest sequence number;

searching for the next required, waiting, or inserted element; and identifying a third set of elements whose flags are not: IGNORE, AVAILABLE, and not COMPLETED, and selecting from said third set of elements the element with which is associated the lowest sequence number.

7. The system as claimed in claim 1, wherein said controller is additionally programmed to:

operate on said received messages with a predetermined set of Resolve Rules;

execute a set of Matrix Scan rules;

find an active element; and if an active element is found, execute said set of Resolve Rules until no element's data value has changed or until a predetermined number of iterations in executing said Resolve Rules has been reached.

8. In a client/server system, including a navigational analysis vehicle (NAV) coupled to a user interface of a client, for processing an application, said application comprising a plurality of events with which are associated a corresponding plurality of messages, wherein said NAV comprises:

means for linking a set of navigation rules associated with said application;

means for accessing a set of received messages associated with said plurality of events in said application;

means for processing each message in said first set of messages, in accordance with said set of navigation rules, whereby a sequence is established, and in accordance with said sequence, selected ones of said multiplicity of screen displays are to be exhibited at said user interface; and means for communicating a second set of messages to said user interface of said application, each message of said second set of messages corresponding to a message in said set of received messages, whereby selected ones of said multiplicity of screen displays at said user interface are controlled in accordance with said sequence.

9. The system as claimed in claim 8, wherein each event of said plurality of events of said application is characterized by a set of descriptors.

10. The method as claimed in claim 9, wherein said set of descriptors comprises:

a set of flags; and a set of rules.

11. The system as claimed in claim 10, wherein said flags are static descriptors characterizing the attributes of said events in said application.

12. The system as claimed in claim 10, wherein said rules are dynamic descriptors characterizing interactions between certain of said events in said application with certain other of said events in said application.

13. The system as claimed in claim 8, wherein each event of said plurality of events of said application is characterized by a set of initial processing rules, a set of cell rules, a sequence number, and an initial flag value.

14. A system for processing an application in a client/server environment and including a controller associated with said application for managing presentation of a multiplicity of screen displays at a user interface of a client, said controller being coupled to said client and programmed to (1) receive messages from said client, (2) process said messages in accordance with a predetermined set of navigation rules associated with said application, (3) establish a sequence by which selected ones of said multiplicity of screen displays are to be exhibited at said user interface, and (4) transmit corresponding messages to said client in accordance with said sequence, said system further including a memory storing matrix data structure for modeling the complex logical relationships associated with interaction of a multiplicity of screen displays at a user interface and other processes associated with the navigation through said multiplicity of screen displays at said user interface associated with said applications by a user at a user interface of a client in a client/server environment, said matrix data structure comprising a plurality of cells configured in a symmetric arrangement of rows and columns, and wherein:

each cell of said plurality of cells is populated with a unique description characterizing the effect of a respective row on a respective column of said matrix data structure.

15. The matrix data structure as claimed in claim 14, wherein each row and each column respectively defines a matrix element, said matrix element corresponding to an event associated with said application.

16. The matrix data structure as claimed in claim 15, wherein each of said matrix elements comprises:

a data value;

a set of flags; and a sequence number.

17. The matrix data structure as claimed in claim 14, wherein each cell of said plurality of cells is populated with at least one of the following:

values;

processing steps;

decision rules; and indicator flags.

18. In a system, including a presentation manager, for processing an application in a client/server environment, said presentation manager controlling presentation of a multiplicity of screen displays at a user interface of a client, wherein said presentation manager comprises:

means for receiving a first set of messages from said client and/or one or more processors associated with said presentation manager;

means for processing said first set of messages, in accordance with a predetermined set of navigation rules associated with said application, to generate a sequence by which selected ones of said multiplicity of screen displays are to be exhibited at said user interface; and means for communicating a second set of corresponding messages to said client in accordance with said sequence, wherein each message included in said second set of messages corresponds to a message in said first set of messages.

19. The system as claimed in claim 18, wherein each message of said first set of messages comprises an element to which said message is addressed.

20. The system as claimed in claim 19, wherein said element is associated with a data value.

21. The system as claimed in claim 18, wherein said predetermined set of navigation rules comprises:
 a set of Resolve Rules; and
 a set of Matrix Scan Rules.

22. The system as claimed in claim 21, wherein said Resolve Rules comprise the steps of:
 adding elements to a list of DATA-CHANGED elements;
 determining whether a predetermined number of iterations in executing said Resolve Rules has been reached;
 if said number of iterations has been reached, terminating execution of said set of Resolve Rules;
 if said number of iterations has not been reached, removing the first element in said list and resetting the DATA-CHANGED Flag to FALSE;
 running said active element's row;
 determining whether said data value associated with any other element has changed, and if so, running said other element's row; and
 if no element's data value has changed, terminating execution of said Resolve Rules.

23. The system as claimed in claim 21, wherein said Matrix Scan Rules comprises the steps of:
 searching for an immediate element;
 if said immediate element is found, terminating execution of said Matrix Scan Rules;
 if said immediate element is not found, identifying a first set of elements whose flags are not: IGNORE, AVAILABLE, and IMMEDIATE, and selecting from said first set of elements the element with the lowest sequence number;
 searching for an open element;
 if said open element is found, terminating execution of said Matrix Scan Rules;
 identifying a second set of elements whose flags are not: IGNORE, AVAILABLE, OPEN, and not COMPLETED, and selecting from said second set of elements the element with the lowest sequence number;
 searching for the next required, waiting, or inserted element; and
 identifying a third set of elements whose flags are not: IGNORE, AVAILABLE, and not COMPLETED, and selecting from said third set of elements the element with the lowest sequence number.

24. The system as claimed in claim 18, wherein said processing means is programmed to:
 operate on said first set of messages with a predetermined set of Resolve Rules;
 execute a set of Matrix Scan Rules;
 find an active element; and
 if an active element is found, execute said set of Resolve Rules until said data value associated with an element has no changes, or until the maximum number of iterations allowed in processing said Resolve Rules has been reached.

25. In a system for processing an application in a client/server environment, said application comprising a plurality of events with which are associated a corresponding plurality of messages, a processor for managing presentation of a multiplicity of screen displays at a user interface of a client said processor programmed to:
 receive a first set of messages from said client and/or one or more processors associated with said controller;
 process, in turn, each message in said first set of messages, in accordance with a predetermined set of navigation rules associated with said application, to establish a sequence by which selected ones of said multiplicity of screen displays are to be exhibited at said user interface; and
 communicate a second set of corresponding messages to said client in accordance with said sequence, wherein each message in said second set of messages corresponds to a message in said first set of messages.

26. The system as claimed in claim 25, wherein said received message comprises an element to which said message is addressed.

27. The system as claimed in claim 26, wherein said element is associated with a data value.

28. The system as claimed in claim 25, wherein said predetermined set of navigation rules includes a set of Resolve Rules and a set of Matrix Scan Rules.

29. The system as claimed in claim 28, wherein said Resolve Rules comprise the steps:
 adding elements to a list of DATA-CHANGED elements;
 determining whether a predetermined number of iterations in executing said Resolve Rules has been reached;
 if said predetermined number of iterations has not been reached, terminating execution of said Resolve Rules;
 if said predetermined number of iterations has not been reached, removing the first element from said list and resetting the DATA-CHANGED Flag to FALSE;
 running said element's row;
 determining whether any other element's data value has changed, and if so, running said other element's row; and
 if no element's data value has changed, terminating execution of said Resolve Rules.

30. The system as claimed in claim 28, wherein said Matrix Scan Rules comprise the steps of:
 searching for an immediate element is found, termination execution of said Matrix Scan rules;
 if said immediate element is found, terminating executing of said Matrix Scan rules;
 if said immediate element is not found, identifying a first set of elements whose flags are not: IGNORE, AVAILABLE, and IMMEDIATE, and selecting from said first set of elements the element with the lowest sequence number;
 searching for an open element;
 if the open element is found, terminating execution of said Matrix Scan rules;
 identifying a second set of elements whose flags are not: IGNORE, AVAILABLE, OPEN, and not COMPLETED, and selecting from said second set of elements the element with the lowest sequence number;
 searching for the next required, waiting, or inserted element; and identifying a third set of elements whose flags are not: IGNORE, AVAILABLE, and not COMPLETED, and selecting from said third set of elements the element with which is associated the lowest sequence number.

31. The system as claimed in claim 25, wherein said processor is further programmed to:
 operate on said first set of messages with a predetermined set of Resolve Rules;
 execute a set of Matrix Scan rules;
 find an active element; and
 if an active element is found, execute said set of Resolve Rules until no element's data value has changed or until a predetermined number of iterations in executing said Resolve Rules has been reached.

32. A system for processing an application in a client/server environment, said application comprising a plurality of events with which are associated a corresponding plurality of messages, said system comprising:

means for managing presentation of a multiplicity of screen displays at a user interface of a client;

means for receiving at said managing means a first set of messages from said client and/or one or more processors associated with said managing means;

means for processing, in turn, each message included in said first set of messages, in accordance with a predetermined set of navigation rules associated with said application, whereby a sequence is established, and in accordance with said sequence, selected ones of said multiplicity of screen displays are to be exhibited at said user interface; and means for communicating a second set of corresponding messages to said client in accordance with said sequence, wherein each message included in said second set of messages corresponds to a message in said first set of messages.

33. In a system for processing an application in a client/server environment, a controller associated with said application for managing presentation of a multiplicity of screen displays at a user interface of a client, said controller coupled to said client and programmed to:

receive messages from said client;

process said messages in accordance with a predetermined set of navigation rules associated with said application, and including a set of resolve rules and a set of matrix scan rules which establish a sequence by which selected ones of said multiplicity of screen displays are to be exhibited at said user interface; and transmit corresponding messages to said client in accordance with said sequence.

34. The system of claim 33 wherein the controller is additionally programmed to:

operate on said received messages with the set of resolve rules;

execute the set of matrix scan rules;

find an active element; and if an active element is found, execute said set of resolve rules until no element's data value has changed or until a predetermined number of iterations in executing said resolve rules has been reached.

35. The system of claim 33 wherein the resolve rules comprise the steps of:

adding elements to a list of DATA-CHANGED elements;

determining whether a predetermined number of iterations in executing said resolve rules has been reached;

if said predetermined number of iterations has been reached, terminating the execution of said resolve rules;

if said predetermined number of iterations has not been reached, removing the first element from said list and resetting the DATA-CHANGED flag to FALSE;

running said element's row;

determining whether any other element's data value has changed and, if so, running said other element's row; and if no element's data value has changed, terminating the execution of said resolve rules.

36. The system of claim 33 wherein the matrix scan rules comprise the steps of:

searching for an immediate element;

if said immediate element is found, terminating the execution of said matrix scan rules;

if said immediate element is not found, identifying a first set of elements whose flags are not: IGNORE, AVAILABLE, and IMMEDIATE, and selecting from said first set of elements the element with the lowest sequence number;

searching for an open element;

if the open element is found, terminating the execution of said matrix scan rules;

identifying a second set of elements whose flags are not: IGNORE, AVAILABLE, OPEN, and not COMPLETED, and selecting from said second set of elements the element with the lowest sequence number;

searching for the next REQUIRED, WAIT, OR INSERT element; and identifying a third set of elements whose flags are not: IGNORE, AVAILABLE, and not COMPLETED, and selecting from said third set of elements the element with which is associated the lowest sequence number.

37. In a system for processing an application in a client/server environment, said application comprising a plurality of events with which are associated with a corresponding plurality of messages, a processor for managing presentation of a multiplicity of screen displays at a user interface of a client, said processor being programmed to:

receive a first set of messages from said client and/or one or more processors associated with said controller;

process, in turn, each message in said first set of messages, in accordance with a predetermined set of navigation rules associated with said application to establish a sequence by which selected ones of said multiplicity of screen displays are to be exhibited at said user interface;

operate on said first set of messages with a predetermined set of resolve rules;

execute a set of matrix scan rules;

search for an active element and, if an active element is found, execute said set of resolve rules until no element's data value has changed or until a predetermined number of iterations in executing said resolve rules has been reached; and communicate a second set of corresponding messages to said client in accordance with said sequence, wherein each message in said second set of messages corresponds to a message in said first set of messages.

* * * * *